US006517707B2

(12) United States Patent
Giordano et al.

(10) Patent No.: US 6,517,707 B2
(45) Date of Patent: *Feb. 11, 2003

(54) WATER TREATMENT DEVICE WITH VOLUMETRIC AND TIME MONITORING FEATURES

(75) Inventors: Edward C. Giordano, Fort Collins, CO (US); Thomas W. Graves, Fort Collins, CO (US); James M. Jennings, Fort Collins, CO (US); Mark Vander Berg, Bellevue, CO (US); William James A. Storer, Loveland, CO (US); Douglas R. Gibbs, Longmont, CO (US); Douglas A. Lonsinger, Lafayette, CO (US)

(73) Assignee: Water Pik, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/903,054

(22) Filed: Jul. 10, 2001

(65) Prior Publication Data

US 2001/0040121 A1 Nov. 15, 2001

Related U.S. Application Data

(63) Continuation of application No. 09/629,876, filed on Aug. 1, 2000, now Pat. No. 6,284,129, which is a continuation of application No. 09/346,164, filed on Jul. 1, 1999, now Pat. No. 6,106,705, which is a continuation of application No. 08/907,683, filed on Aug. 8, 1997, now Pat. No. 5,935,426.

(51) Int. Cl.[7] .......................... B01D 35/143; G01F 1/05
(52) U.S. Cl. ................... 210/87; 73/861.77; 73/861.79; 73/861.87; 210/94; 210/449
(58) Field of Search ............................. 210/85, 87, 88, 210/89, 94, 100, 106, 108, 138, 139, 433, 1, 449, 460; 340/606, 607, 609; 137/551, 801; 73/861.77, 861.78, 861.79, 861.87, 861.08; 96/417, 422; 200/81.9 R, 81.9 M

(56) References Cited

U.S. PATENT DOCUMENTS 329,064 A    10/1885  Moore (List continued on next page.)

FOREIGN PATENT DOCUMENTS

EP    267701    5/1988
EP    340382    11/1989

(List continued on next page.)

OTHER PUBLICATIONS

WaterWare™, Use and Care Manual, 1996.
Kleen Plus™, Replacement Filter Package, 1993.
Filter Products Chart, 1997.
"Use and Care Manual," PUR, 1995.

*Primary Examiner*—Joseph W. Drodge
(74) *Attorney, Agent, or Firm*—Dorsey & Whitney LLP

(57) ABSTRACT

A totalization meter system for a water treatment device, the device having an inlet aperture and an outlet aperture, and a channel for channeling water between the inlet and outlet apertures. A flow reactive device is positioned in the channel and is exposed to the flowing water, and a signal generating member is positioned on the flow reactive device. A switch is positioned proximately to the flow reactive device, and is sensitive to the proximity of the signal generating member. The switch is able to communicate electric signals indicative of the motion of the signal generating member. A resettable processor having a performance threshold programmed therein and an output device is included. The microcontroller is in electrical communication with the switch for receiving electrical signals from the switch. The switch is capable of sensing the characteristics of the flow reactive device and communicates electrical signals representative of the characteristics to the microcontroller. The microcontroller interprets the signals as a first performance data. The microcontroller compares the first performance data against the respective performance threshold in the microcontroller to determine if the performance threshold has been surpassed, and if surpassed actuates the output device.

17 Claims, 14 Drawing Sheets

U.S. PATENT DOCUMENTS

| | | |
|---|---|---|
| 535,817 A | 3/1895 | Darling et al. |
| 606,804 A | 7/1898 | Eastman |
| 1,934,159 A | 11/1933 | Auberschek |
| 2,019,319 A | 10/1935 | Robinovitz |
| 2,280,033 A | 4/1942 | Aldham |
| 2,499,494 A | 3/1950 | Greer |
| 2,736,435 A | 2/1956 | Gardes |
| 2,886,180 A | 5/1959 | Morgan et al. |
| 3,002,384 A | 10/1961 | MacDonald |
| 3,160,008 A | 12/1964 | Gestler |
| 3,250,397 A | 5/1966 | Moltchan |
| 3,263,812 A | 8/1966 | Hartley |
| 3,266,628 A | 8/1966 | Price |
| 3,331,509 A | 7/1967 | Gray, Jr. |
| 3,439,809 A | 4/1969 | McPherren |
| 3,450,632 A | 6/1969 | Olson et al. |
| 3,474,600 A | 10/1969 | Tobias |
| 3,520,417 A | 7/1970 | Durr et al. |
| 3,540,030 A | 11/1970 | Hartz |
| 3,556,304 A | 1/1971 | Collard et al. |
| 3,585,596 A | 6/1971 | Rosenblatt |
| 3,595,399 A | 7/1971 | Whittier et al. |
| 3,724,665 A | 4/1973 | Hall |
| 3,746,168 A | 7/1973 | Willinger et al. |
| 3,802,563 A | 4/1974 | Sasaki et al. |
| 3,853,761 A | 12/1974 | McClory |
| 3,950,251 A | 4/1976 | Hiiller |
| 4,036,755 A | 7/1977 | Dahm et al. |
| 4,059,520 A | 11/1977 | Roller |
| 4,121,199 A | 10/1978 | Young |
| 4,147,631 A | 4/1979 | Deines et al. |
| 4,154,586 A | 5/1979 | Jones et al. |
| 4,172,796 A | 10/1979 | Corder |
| 4,195,522 A | 4/1980 | Anderson et al. |
| 4,199,982 A | 4/1980 | Wemyss |
| 4,212,743 A | 7/1980 | Van Meter et al. |
| 4,218,317 A | 8/1980 | Kirschmann |
| 4,224,826 A | 9/1980 | McLoughlin et al. |
| 4,253,341 A | 3/1981 | Ikeda et al. |
| 4,265,127 A | 5/1981 | Onoda |
| 4,271,015 A | 6/1981 | Moore |
| 4,272,368 A | 6/1981 | Foord et al. |
| 4,298,025 A | 11/1981 | Prior et al. |
| 4,310,828 A | 1/1982 | Baker |
| 4,321,461 A | 3/1982 | Walter, Jr. et al. |
| 4,361,050 A | 11/1982 | Coussot et al. |
| 4,404,860 A | 9/1983 | Wood et al. |
| 4,406,291 A | 9/1983 | Schwesinger |
| 4,431,533 A | 2/1984 | Wrede |
| 4,431,717 A | 2/1984 | Kikuchi |
| 4,487,820 A | 12/1984 | Engelstein et al. |
| 4,489,616 A | 12/1984 | Priddy |
| 4,504,389 A | 3/1985 | Rundzaitis |
| 4,512,201 A | 4/1985 | Konrad |
| 4,522,077 A | 6/1985 | Koberle |
| 4,534,227 A | 8/1985 | Petit |
| 4,536,290 A | 8/1985 | Bonazzo |
| 4,561,979 A | 12/1985 | Harms et al. |
| 4,591,438 A | 5/1986 | Tanabe et al. |
| 4,623,451 A | 11/1986 | Oliver |
| 4,656,873 A | 4/1987 | Stewart |
| 4,666,061 A | 5/1987 | Pluess |
| 4,680,116 A | 7/1987 | Kamiwada et al. |
| 4,681,677 A | 7/1987 | Kuh et al. |
| 4,685,066 A | 8/1987 | Hafele et al. |
| 4,686,037 A | 8/1987 | Lang |
| 4,698,164 A | 10/1987 | Ellis |
| 4,708,790 A | 11/1987 | Bray |
| 4,711,723 A | 12/1987 | Bray |
| 4,713,175 A | 12/1987 | Bray |
| 4,732,674 A | 3/1988 | Tamura et al. |
| 4,753,728 A | 6/1988 | Vanderbilt et al. |
| 4,769,135 A | 9/1988 | Norton |
| 4,770,768 A | 9/1988 | Lang |
| 4,772,386 A | 9/1988 | Grout et al. |
| 4,786,473 A | 11/1988 | Mukogawa et al. |
| 4,808,994 A | 2/1989 | Riley |
| 4,814,078 A | 3/1989 | Stern et al. |
| 4,833,925 A | 5/1989 | Bullock et al. |
| 4,848,164 A | 7/1989 | Quarve et al. |
| 4,849,098 A | 7/1989 | Wilcock et al. |
| 4,853,302 A | 8/1989 | Yamanslaka et al. |
| 4,869,820 A | 9/1989 | Yee |
| 4,877,521 A | 10/1989 | Petrucci et al. |
| 4,885,081 A | 12/1989 | Oliver |
| 4,902,427 A | 2/1990 | Szczepanik |
| 4,918,426 A | 4/1990 | Butts et al. |
| 4,936,508 A | 6/1990 | Ingalz |
| 5,014,552 A | 5/1991 | Kamiunten et al. |
| 5,017,286 A | 5/1991 | Heiligman |
| 5,050,772 A | 9/1991 | Brane et al. |
| 5,055,641 A | 10/1991 | Richards |
| 5,057,821 A | 10/1991 | Card |
| 5,060,167 A | 10/1991 | Ticcioni et al. |
| 5,065,901 A | 11/1991 | Brane et al. |
| 5,078,876 A | 1/1992 | Whittier et al. |
| 5,089,144 A | 2/1992 | Ozkahyaoglu et al. |
| 5,099,699 A | 3/1992 | Kobold |
| 5,106,500 A | 4/1992 | Hembree et al. |
| 5,114,570 A | 5/1992 | Nelson et al. |
| 5,126,043 A | 6/1992 | Giordano |
| 5,128,034 A | 7/1992 | Kool |
| 5,151,179 A | 9/1992 | Bach et al. |
| 5,160,038 A | 11/1992 | Harada et al. |
| 5,192,436 A | 3/1993 | Sasaki et al. |
| 5,236,578 A | 8/1993 | Oleskow et al. |
| 5,240,792 A | 8/1993 | Kawabata et al. |
| 5,268,093 A | 12/1993 | Hembree et al. |
| 5,328,597 A | 7/1994 | Boldt, Jr. et al. |
| 5,457,665 A | 10/1995 | Reid |
| 5,458,766 A | 10/1995 | Ehara et al. |
| 5,525,214 A | 6/1996 | Hembree |
| 5,527,451 A | 6/1996 | Hembree et al. |
| 5,536,394 A | 7/1996 | Lund et al. |
| 5,540,107 A * | 7/1996 | Silverman et al. ............ 210/87 |
| 5,549,010 A | 8/1996 | Park et al. |
| 5,556,271 A | 9/1996 | Zuercher et al. |
| 5,586,045 A | 12/1996 | Box et al. |
| 5,676,824 A | 10/1997 | Jeon et al. |
| RE35,667 E | 11/1997 | Heiligman |
| 5,721,383 A | 2/1998 | Franklin et al. |
| 5,744,033 A | 4/1998 | Bertrand et al. |
| 5,814,212 A | 9/1998 | Hsu |
| D399,141 S | 10/1998 | Huang et al. |
| 5,823,229 A | 10/1998 | Bertrand et al. |
| 5,824,914 A | 10/1998 | Seppa et al. |
| 5,858,215 A | 1/1999 | Burchard et al. |
| 5,865,991 A | 2/1999 | Hsu ........................... 210/87 |
| 5,873,995 A | 2/1999 | Huang et al. |
| 5,876,610 A | 3/1999 | Clack et al. |
| 5,888,381 A | 3/1999 | Primdahl et al. |
| 5,900,138 A | 5/1999 | Moretto ..................... 210/85 |
| 5,928,504 A | 7/1999 | Hembre et al. |
| 5,935,426 A | 8/1999 | Giordano et al. |
| 5,976,362 A | 11/1999 | Wadsworth et al. |
| 6,024,867 A | 2/2000 | Parise |
| 6,093,313 A | 7/2000 | Bovaird et al. ............... 210/94 |
| 6,106,705 A | 8/2000 | Giordano et al. |
| 6,123,837 A | 9/2000 | Wadsworth et al. .......... 210/87 |
| 6,149,801 A | 11/2000 | Giordano et al. |
| 6,214,239 B1 | 4/2001 | Renau ....................... 210/739 |

| | | | | | | |
|---|---|---|---|---|---|---|
| 6,224,751 | B1 | 5/2001 | Hofmann et al. .............. 210/85 | JP | 1218612 | 8/1989 |
| 6,284,129 | B1 | 9/2001 | Giordano et al. | JP | 4322781 | 11/1992 |
| 6,306,290 | B1 | 10/2001 | Rolfes ......................... 210/85 | WO | 9100986 | 1/1991 |
| 6,375,834 | B1 | 4/2002 | Guess et al. ................... 210/85 | WO | 9105600 | 5/1991 |
| | | | | WO | 9115281 | 10/1991 |
| | | | | WO | 9115282 | 10/1991 |

FOREIGN PATENT DOCUMENTS

| | | |
|---|---|---|
| GB | 273348 | 7/1927 |
| GB | 2206292 | 6/1987 |
| GB | 2219662 | 6/1988 |
| JP | 63104666 | 5/1988 |
| JP | 63107716 | 5/1988 |

| | | |
|---|---|---|
| WO | 9119555 | 12/1991 |
| WO | 9119556 | 12/1991 |
| WO | 9524256 | 9/1992 |

\* cited by examiner-

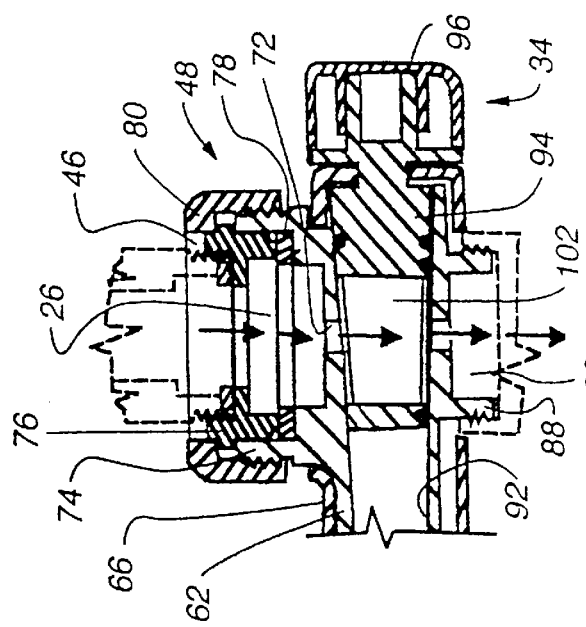
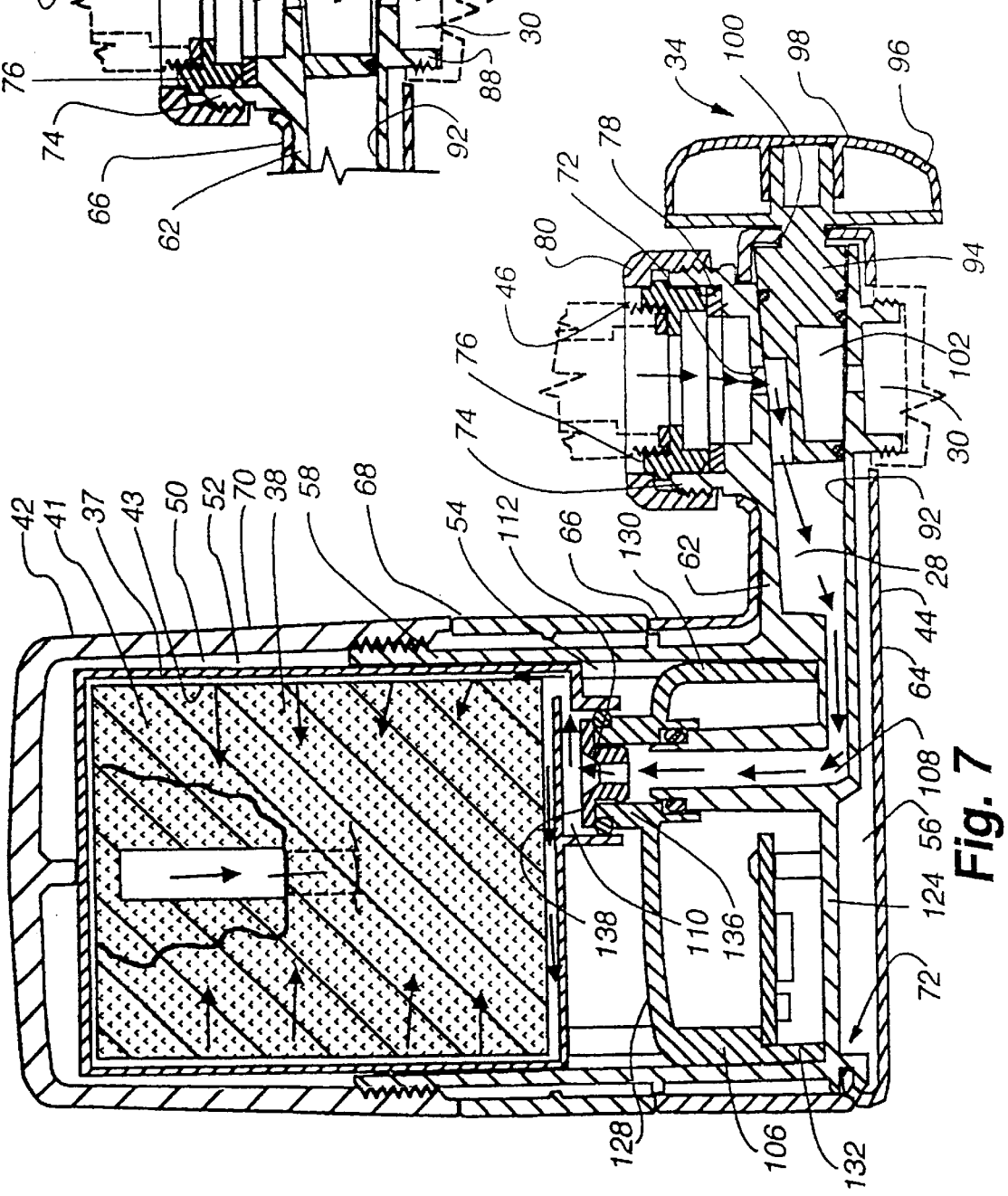

WATER TREATMENT DEVICE WITH VOLUMETRIC AND TIME MONITORING FEATURES

CROSS REFERENCE TO RELATED APPLICATIONS

This application is a continuation of U.S. patent application Ser. No. 09/629,876, Filed Aug. 1, 2000, now U.S. Pat. No. 6,284,129, issued Sep. 4, 2001, which is a continuation of U.S. patent application Ser. No. 09/346,164, filed Jul. 1, 1999, now U.S. Pat. No. 6,106,705, issued Aug. 22, 2000, which is a continuation of U.S. patent application Ser. No. 08/907,683, filed Aug. 8, 1997, now U.S. Pat. No. 5,935,426, issued Aug. 10, 1999.

FIELD OF THE INVENTION

The invention relates to water treatment devices, and more particularly relates to new and improved monitoring devices for determining the status of a replaceable filter cartridge in a water treatment device.

BACKGROUND OF THE INVENTION

Faucet-attachment types of water filters have become a viable commercial product, possibly by reason of the fact that they do not require changes in plumbing to allow their use in the home or similar environment. Typically, the water treatment devices attach to the outlet of a faucet in the kitchen sink and include valving to permit flow of either unfiltered or filtered water, the water to be filtered flowing through a replaceable cartridge mounted upon one portion of the water filter.

Information regarding the condition of a replaceable filter cartridge in a water treatment device is helpful in order to know how much of its useful life remains. Typically, replaceable cartridge elements for faucet-attached water treatment devices are rated for the number of gallons that can be treated, or for a time duration of use (e.g., a number of months of service). A typical filter cartridge is rated for about 200 gallons of flow, or three months, whichever occurs first. However, if the consumer cannot easily determine when 200 gallons have passed through the cartridge, or when the time duration lapses, it is very difficult to replace the filter cartridge at the proper time. It is highly desirable to provide an indication to the user when the filter cartridge is fit for consumption, and an indication of when the filter cartridge should be replaced.

Missing in the art is an end-of-faucet filter having adequate and desirable flow and time monitoring features to alert the user that the filter media is nearly depleted, requires replacement, and reminds the user to flush the filter cartridge at the appropriate times. It is with these shortcomings in the existing art that the present invention was developed.

SUMMARY OF THE INVENTION

A faucet-attached water treatment device includes a totalizer meter system to sum the volume of water passing through the device and the time since the filter cartridge was installed, and to warn the user of either approaching maximum filter cartridge capacity based on flow, or wherein time-based milestones have been reached. The totalization system includes multiple visual signals to the user to indicate when the filter cartridge is usable, when the cartridge has reached approximately 90% of its capacity, and when 100% capacity is reached. Significant functions of the totalization meter system include:

1. Indicating to the user that the treatment capacity of the filter cartridge has been reached.
2. Indicating to the user that a predetermined percentage of the total treatment capacity of the filter cartridge has been reached. This serves as a warning of the approaching end of cartridge capacity and provides the user adequate time to purchase a new replacement cartridge.
3. Indicating to the user that the dispensed water is acceptable to consume by way of a steady operating signal.
4. Reminding the user to adequately flush the filter cartridge before each use.
5. Reminding the user to adequately flush the filter cartridge upon installation of a new replacement cartridge.

According to the present invention, a totalization meter system for a water treatment device is described, the device having an inlet aperture and an outlet aperture, and a channel for channeling water between the inlet and outlet apertures. A flow reactive device is positioned in the channel and is exposed to the flowing water, and a signal generating member is positioned on the flow reactive device. A switch is positioned proximately to the flow reactive device, and is sensitive to the proximity of he signal gene rating member. The switch is able to communicate electric signals indicative of the motion of the signal generating member. A resettable processor, such as a microcontroller, is also included, having performance thresholds programmed therein, and an output device. The microcontroller is in electrical communication with the switch for receiving electrical signals from the switch. The switch is capable of sensing the characteristics of the flow reactive device and communicates electrical signals representative of the characteristics to the microcontroller. The microcontroller interprets the signals as a first performance data, the microcontroller also having a time counter for totaling the time lapse since the microcontroller was last reset. The microcontroller interprets the time lapse as a second performance data, and the microcontroller compares the first performance data and the second performance data against the respective performance thresholds in the microcontroller to determine if the performance threshold has been surpassed, and when surpassed actuates the output device.

In more detail, the flow-reactive device is a turbine, and the signal generating member is a magnet element. The magnetic element is integral with the turbine and is sensed by a stationary sensor which counts total turbine revolutions. The revolution count is proportional to the volume of water passing through the device. The sensor may be a reed switch, or other means of sensing the field produced by the passing of a magnetic or field-producing element.

The microcontroller is used to count and store the rotations of the turbine, among its many functions. It also tracks the time duration since the last time the microcontroller was reset, normally during the installation of the current filter cartridge.

In a preferred embodiment, the microcontroller signals a yellow light-emitting diode (LED) as a warning of the approaching end of the useful life of the filter cartridge. In the case where the filter cartridge is rated for 200 gallons or 90 days, the yellow LED emits a signal after 180 gallons of flow, or approximately 81 days. At this point, the consumer should be planning to replace the cartridge, but will have another 20 gallons, or approximately 9 days, of capacity left. A red LED signal after the passage of 200 gallons, or 90 days, indicates to the user that the cartridge should be replaced immediately. When the cartridge is in the useful portion of its life prior to the yellow or red signals, a green signal is given to inform the user that the treated water is acceptable for consumption.

Further advantages offered by the design include means to continually reinforce to the user the need to flush replacement cartridges upon installation and prior to each use. In the case of a new cartridge installation, the fresh cartridge is to undergo a two minute water flush period to rid the cartridge of entrapped air and activated carbon fines. The air bubbles and fine particulates in the first water cause the water to be cloudy and therefore undesirable. This invention features signaling means informing the user to wait for the two minute flush period by way of flashing a cautionary yellow LED for the duration of the two minute period. Once in service, the cartridge is to be flushed by the user for three seconds at the start of each use, reminding the user of the need to discard at least one filter cartridge unit volume of water. This water tends to be warm from sitting in the device, and is less palatable than the freshly filtered water that follows. This invention features signaling means informing the user to wait for the three second flush period by way of delaying the positive green LED for the duration of the three second flush period.

A more complete appreciation of the present invention and its scope can be obtained from understanding the accompanying drawings, which are briefly summarized below, the following detailed description of the presently preferred embodiments of the invention, and the appended claims.

BRIEF DESCRIPTION OF THE DRAWINGS

FIG. 6 is a representational section view of the valve in the bypass position.

FIG. 7 is a section taken along line 7—7 of FIG. 3.

DETAILED DESCRIPTION OF THE PREFERRED EMBODIMENT

Figure 1:
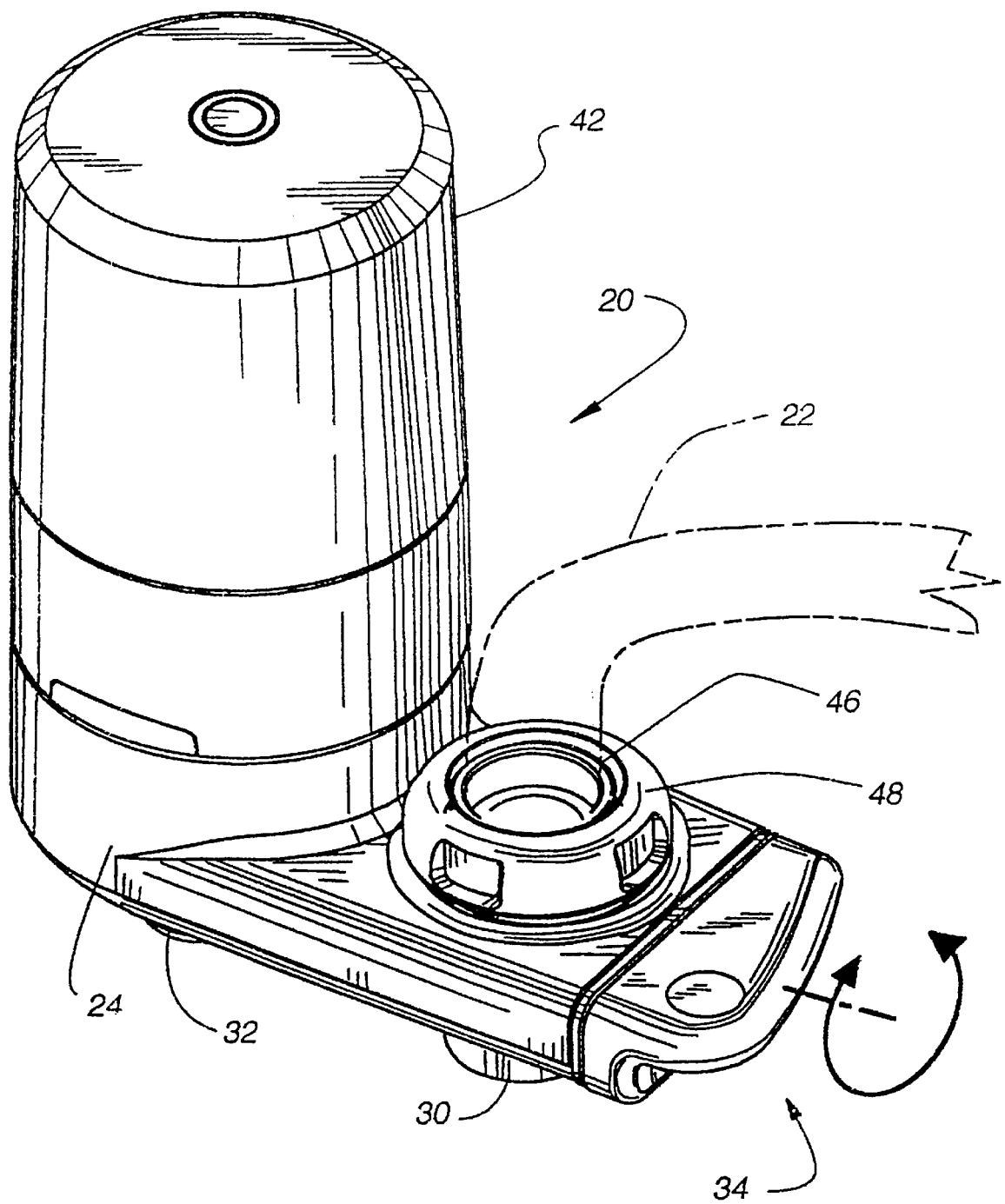
FIG. 1 is a perspective view of the water treatment device incorporating the present invention.
Figure 3:
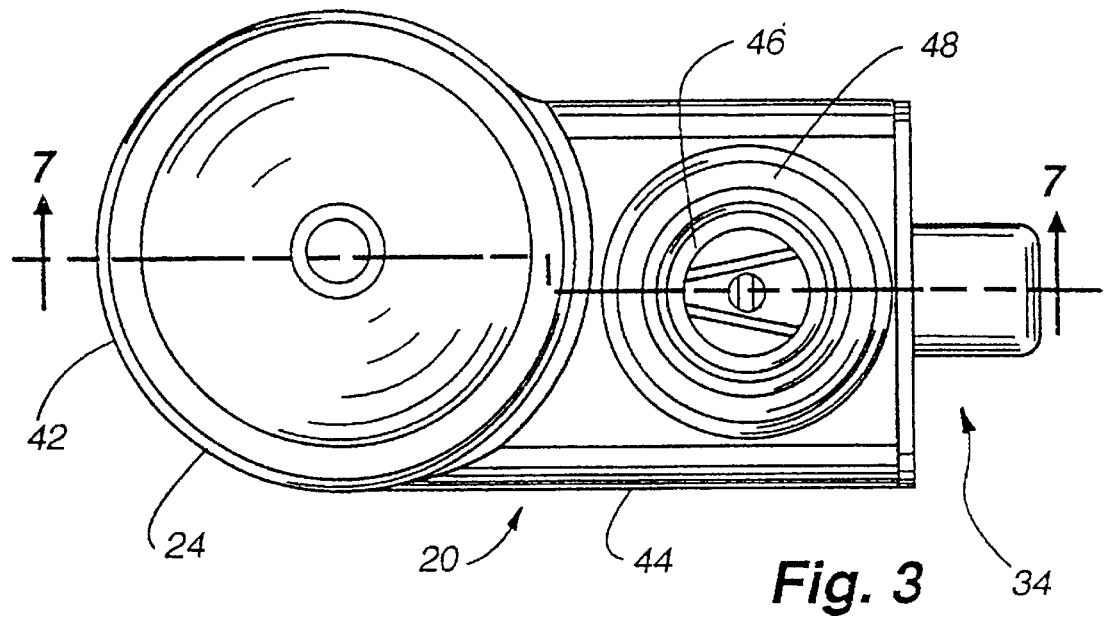
FIG. 3 is a top view of the water treatment device incorporating the present invention.
Figure 2:
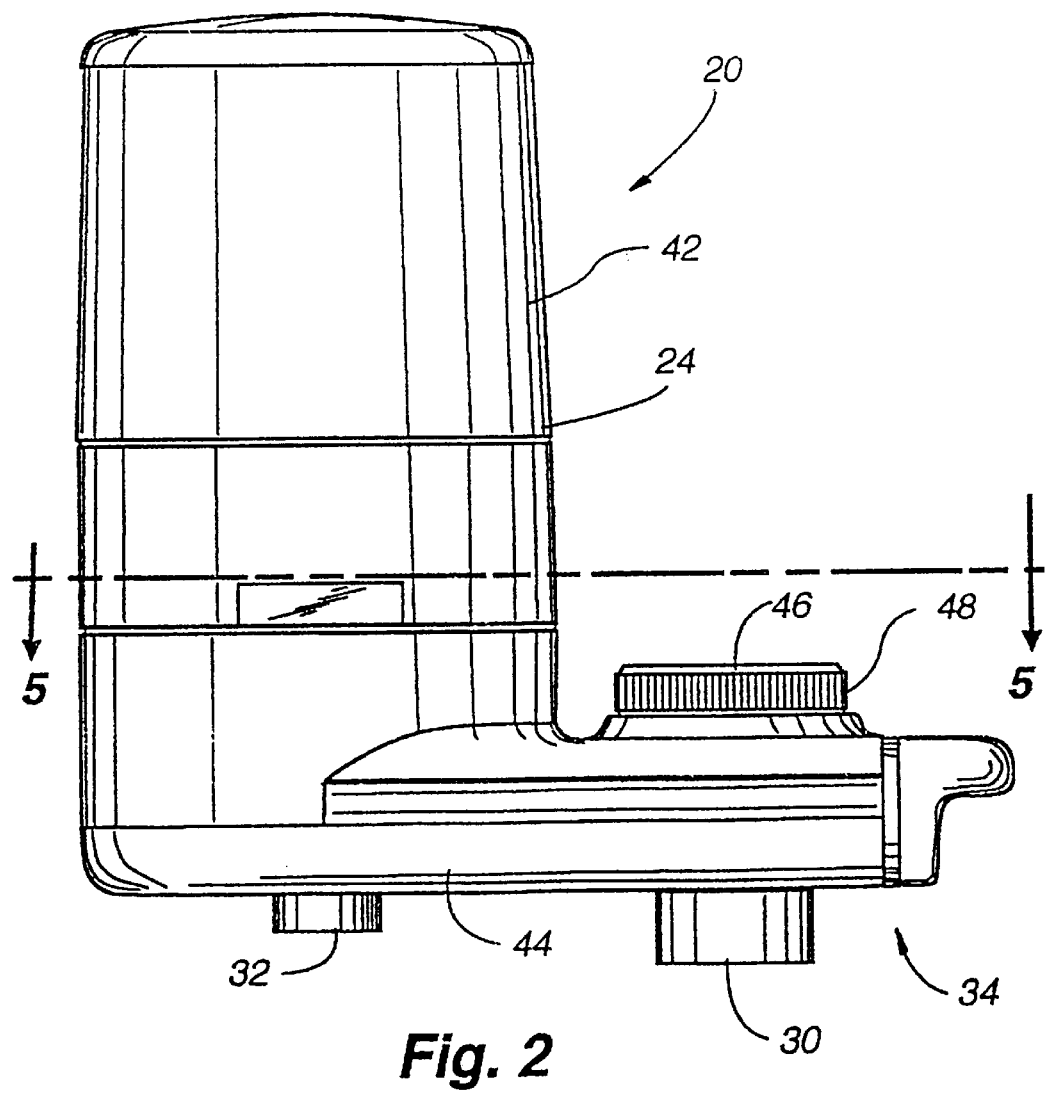
FIG. 2 is a front view of the water treatment device incorporating the present invention.
Figure 4A:
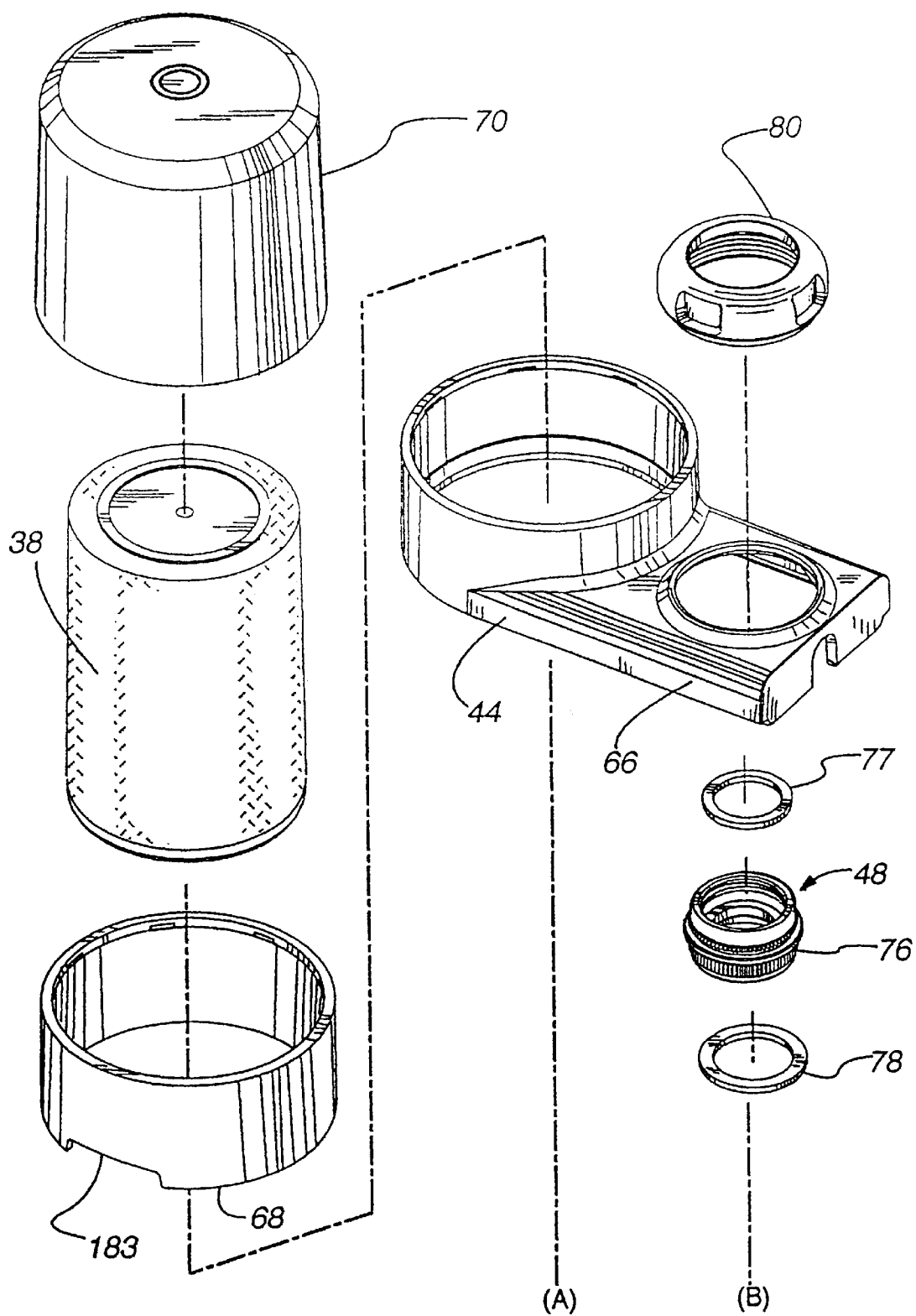
FIGS. 4A–4C are an enlarged exploded view of the water treatment device incorporating the present invention.
Figure 4B:
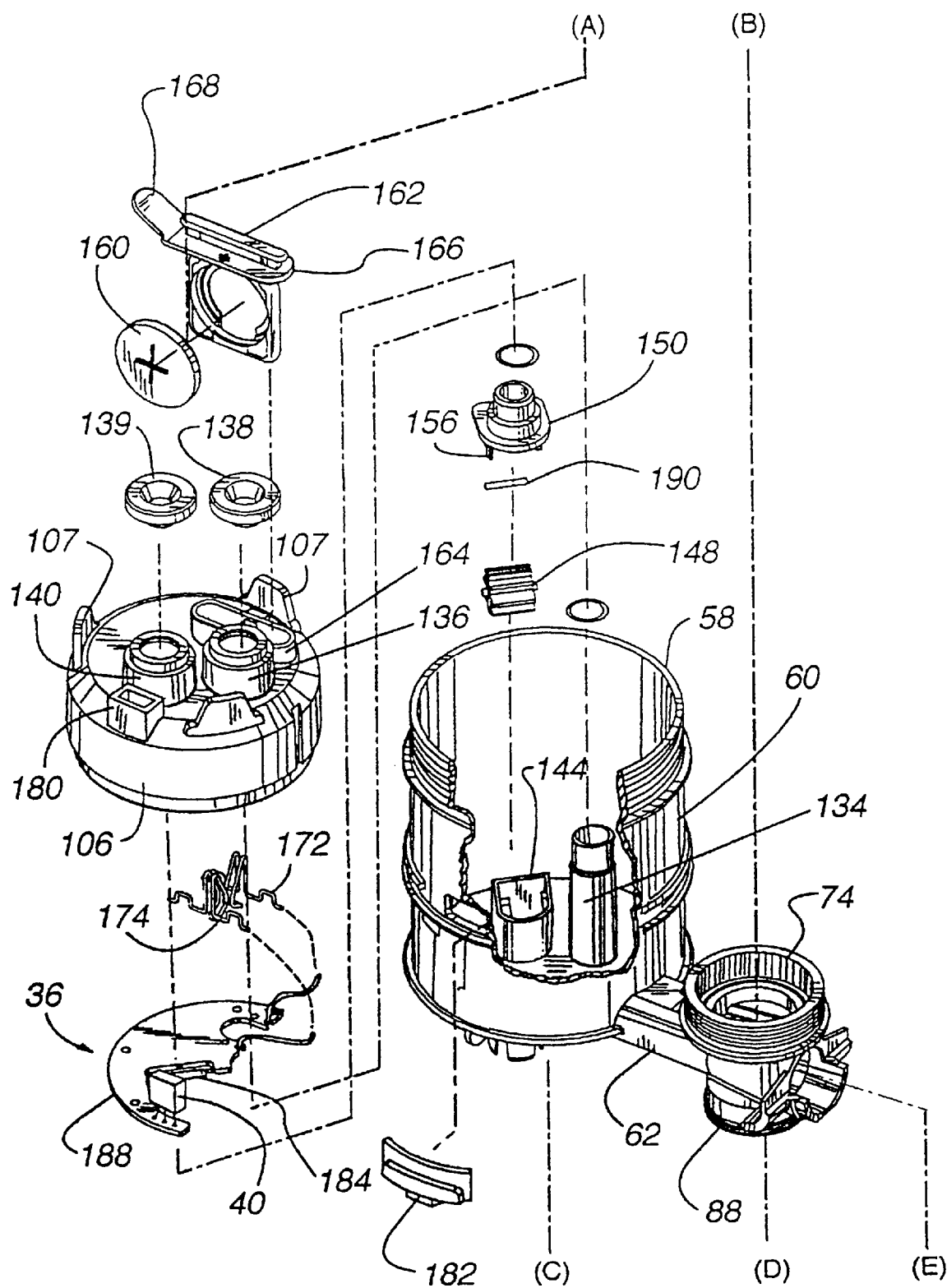
Figure 4C:
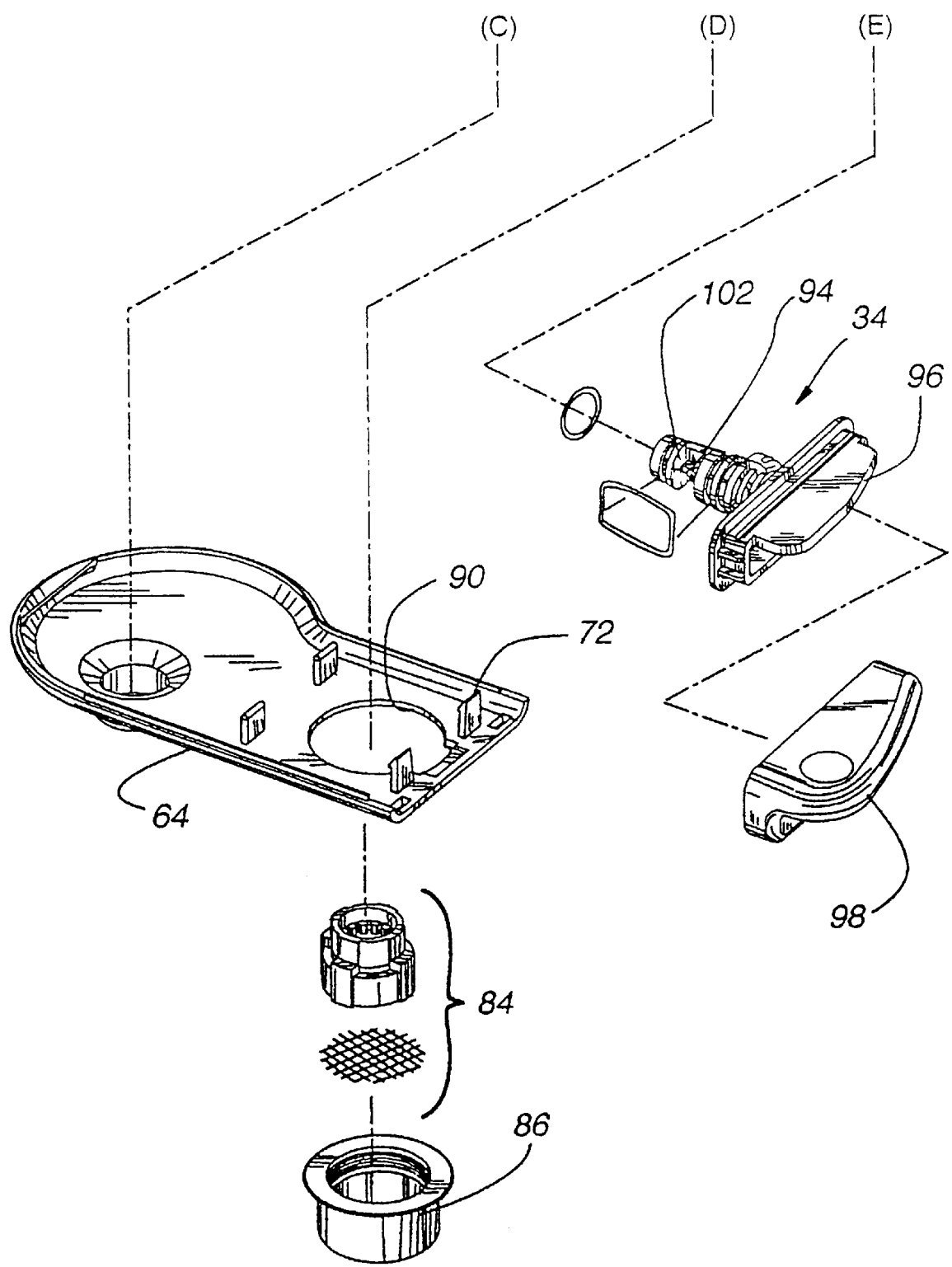
Figure 5:
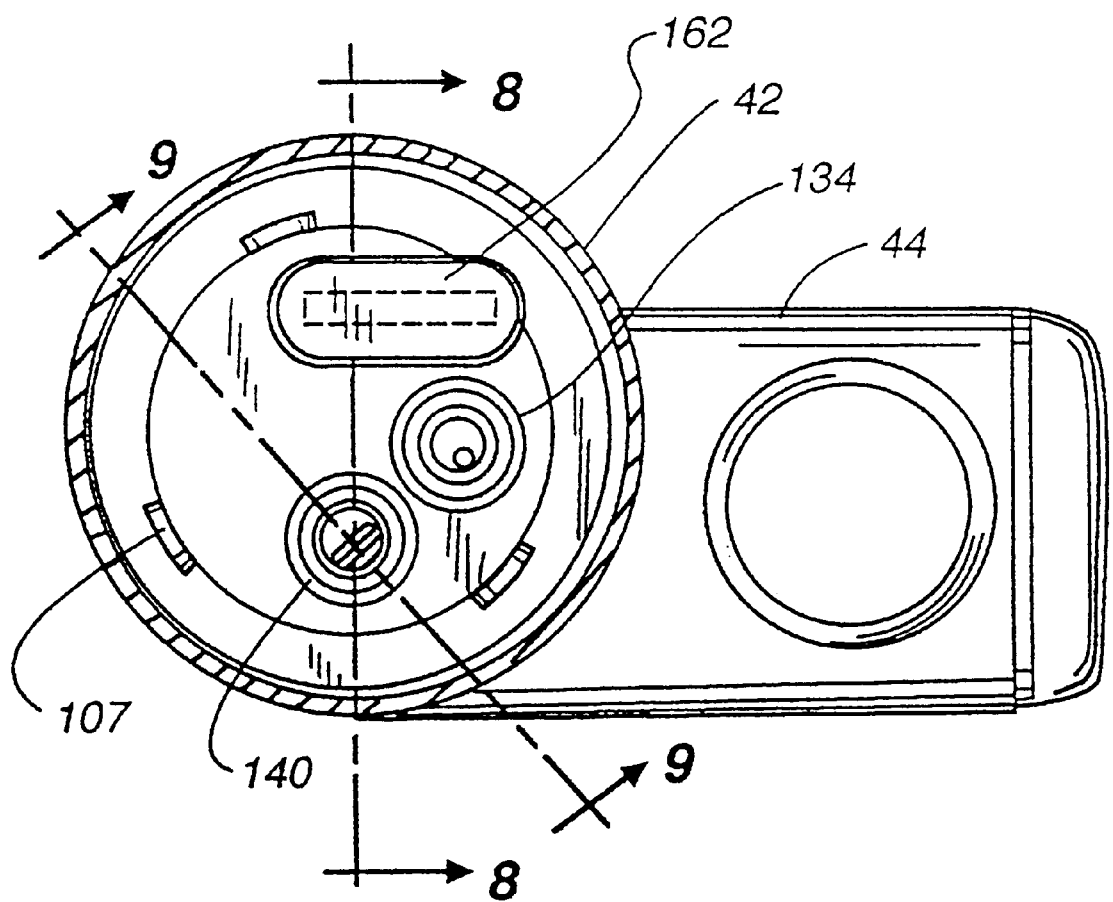
FIG. 5 is a section taken along line 5—5 of FIG. 2.

Referring to FIGS. 1, 2 and 3, an end-of-faucet water treatment device 20 is shown which incorporates the water flow and time totalization meter system of the present invention. The water treatment device has a replaceable filter which is embodied in a mechanical and/or adsorptive filter cartridge for reducing undesirable contaminants from potable water supplies. The particular embodiment of the water treatment device described herein is attached to the end of a kitchen sink faucet 22, and is more typically known as an end-of-faucet (EOF) filter. The totalization meter system sums the volume of flow through the filter cartridge using a rotating turbine, as well as the total time since the meter system was reset.

The water treatment device includes a main body 24 defining a first non-filtered bypass flow path 26 (FIG. 6), and a second filtered flow path 28 (FIG. 7). The main body is attached to a water source, such as faucet 22, and defines a bypass outlet 30 and a filtered outlet 32. The meter system and a filter cartridge are located in the main body in-line with the second litered flow path 28. A valve 34 is included in the main body 24 and is actuable to control the flow of the water between the first 26 and second 28 flow paths. When the bypass 26 flow path is selected, the water flows from the faucet 22 directly to the bypass outlet 30 and does not flow through the filter cartridge. When the filtered flow path 28 is selected, the water flows from the faucet 22, into the main body 24, through the filter cartridge, through the totalization system, and to the filtered outlet 32.

The meter system 36 of the present invention, as shown in FIGS. 4, 5, 8 and 9, collects data pertaining to the total volume of water flowing through the filter cartridge 38, and the total time since the meter system was last reset or activated. The total volume of water flowing through the meter system 36 and the total time since the system was last activated are both indicative of the remaining life of the replaceable filter cartridge 38. This performance or status data is accumulated by the meter system 36 and output to the user through an output device 40 to indicate to the user the functional status of the filter cartridge 38. There are different stages of output information provided to the user by the meter system, which are described in greater detail below.

In greater detail, the water treatment device is shown in FIGS. 1, 2, 3 and 4A–C. The water treatment device includes a main body 24 having an upright portion 42 and a laterally extending portion 44 attached to the bottom of the upright portion. The laterally extending portion 44 includes an inlet aperture 46 for receiving water from the water source, attachment structure 48 associated with the inlet aperture 46 for connecting the water treatment device 20 to the water source, such as the standard faucet 22, a valve 34 for directing the water along the first 26 or second 28 flow paths, and the bypass outlet aperture 30.

Figure 8:
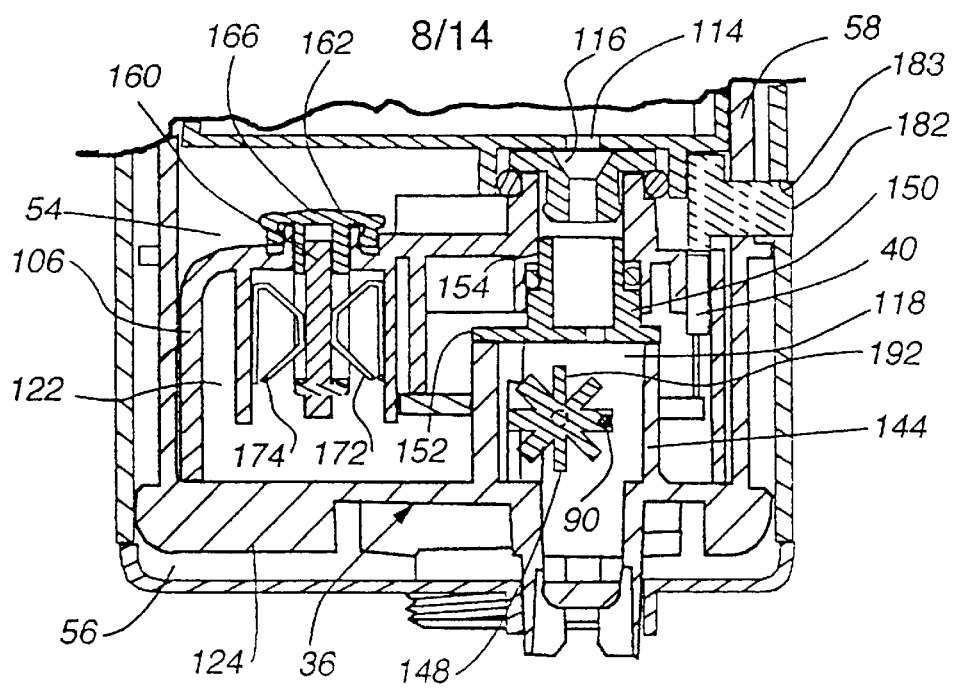
FIG. 8 is a section taken along line 8—8 of FIG. 5.
Figure 9:
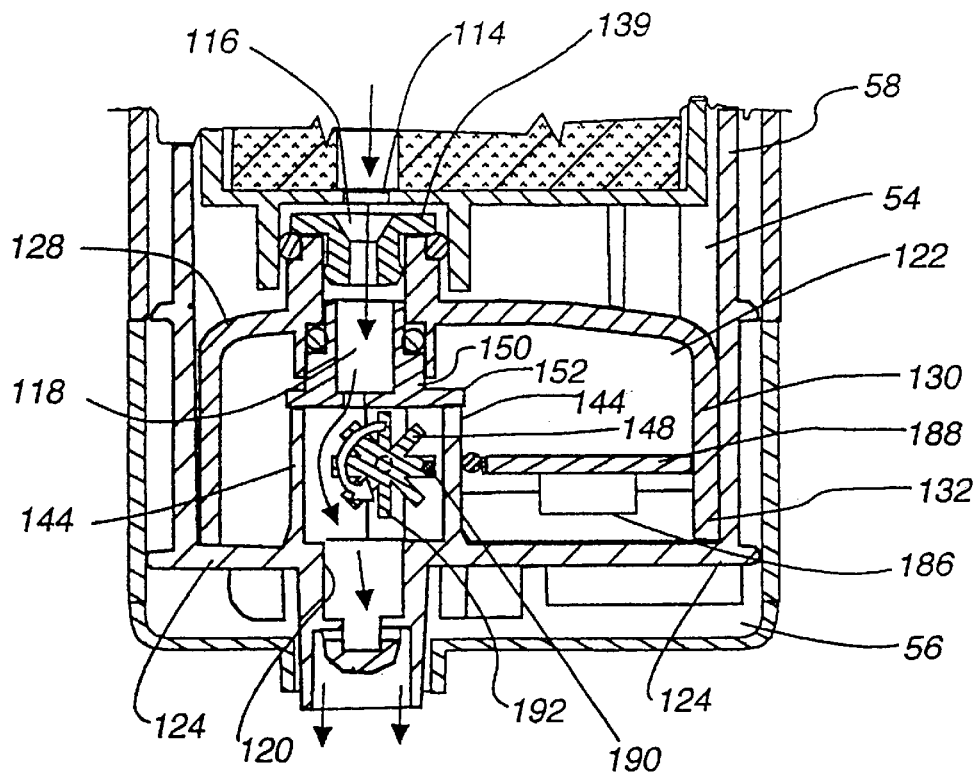
FIG. 9 is a section taken along line 9—9 of FIG. 5.
Figure 10:
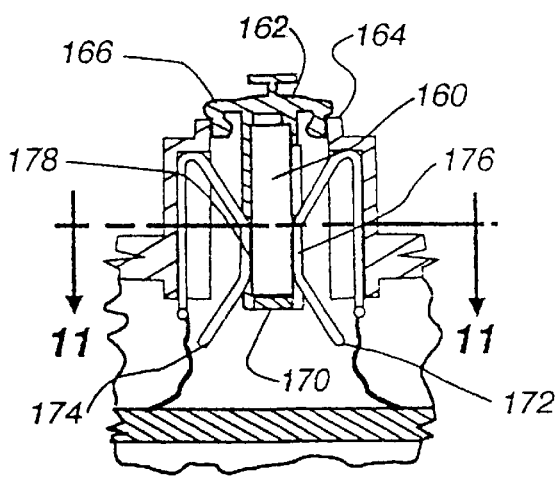
FIG. 10 is a representation partial section of the battery clips as shown in FIG. 8.
Figure 11:
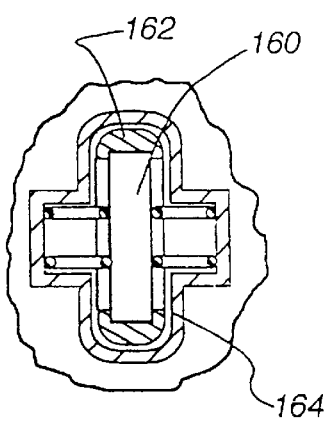
FIG. 11 is a section taken along line 11—11 of FIG. 10.
Figure 13:
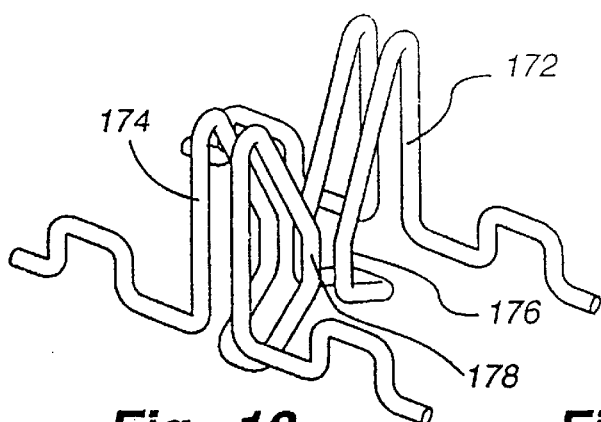
FIG. 13 is an enlarged perspective view of the battery clips as shown in FIG. 4B.

The upright portion 42 of the main body 24 forms, as best shown in FIGS. 7, 8 and 9, a vertically oriented chamber 50 which includes a top portion 52 for receiving the replaceable filter cartridge 38, a middle portion 54 for receiving the meter system 36, and a bottom portion 56 and the filtered outlet aperture 32. As shown in FIG. 4, the main body 24 is generally formed by a skeletal housing structure 58 having upright 60 and laterally 62 extending portions, analogous to the main body 24, and external shroud members, including the base 64, lower portion 66, riser 68 and cap 70. The skeletal housing structure 58 contains, supports, and positions the filter cartridge 38 and meter system 36, while the external shroud members 64, 66, 68 and 70 mainly provide the desired aesthetic look.

The top of the upright portion 60 of the skeletal structure 58 is externally threaded to receive the internal threads of the top portion 70 of the housing shroud. Once the base 64 of the housing shroud is positioned underneath the skeletal structure 58, the lower portion 66 of the housing shroud is slid over the skeletal structure 58 to engage the base 64 of the shroud and enclose much of the skeletal structure 58. The base 64 and the lower portion 66 of the shroud are held in place together by a beveled latch mechanism 72. The riser portion 68 of the shroud is then slid over the skeletal structure 58 to engage the lower portion 66. Finally, the cap 70 is threadedly received by the skeletal structure 58 to secure the lower portion 66 and the riser portion 68 on the skeletal structure 53.

The inlet aperture structure 48, bypass outlet aperture structure 30, and valve 34 structure are best shown in FIGS. 4A–C, 6 and 7. The inlet aperture 48 structure allows the water treatment device to releasably attach to the end of a standard faucet 22. The lateral extending portion 62 of the skeletal structure 58 and the lower portion 66 of the shroud both define apertures for aligned orientation, which together form the inlet aperture 46. The aperture 72 on the lateral extending portion 62 of the skeletal structure 58 includes an externally threaded collar 74 which extends upwardly through the aperture in the shroud. An insert bushing 76 is sealing mated with a washer 78 in the collar 74 to an interior annular shoulder formed around the aperture in the skeletal structure 58. The insert bushing 76 has a radially outwardly extending flange, and internal threading terminating in a radially internally extending flange. The internal threading on the bushing 76 receives the external threading on the faucet 22 to attach the water treatment device thereto. The end of the faucet butts against the internally radially extending flange in the bushing 76 and is sealed therein with a washer 77. An internally threaded retaining nut 80 engages the outwardly extending radial flange on the bushing 76, and threadedly engages the external threads on the collar 74 to clamp the bushing 76 and the rest of the assembly together in a watertight manner.

The outlet aperture includes a filter screen assembly 84, and retaining nut 86. The retaining nut 86 threadedly attaches to an externally threaded collar 88 extending from the bypass aperture 30 on the laterally extending portion 62 of the skeletal structure 58. The collar 88 extends downwardly through the outlet aperture 90 formed in the base portion 64 of the shroud. The retaining nut 86 positions the washer and filter screen assembly in the bypass outlet aperture 30.

The valve 34 inserts into a longitudinal bore 92 formed in the lateral extension 62 of the skeletal structure 58, and when assembled therein directs the water to the first flow path 26 to bypass the filter cartridge 38, or directs the water to the second flow path 28 and through the filter cartridge 38. The valve 34 includes a generally frustoconically shaped stem 94 terminating in a T-handle 96. An external shroud portion 98 fits over the T-handle 96 to match the other parts of the external shroud. An annular groove 100 is formed between the T-handle 96 and the stem 94, creating a section having a reduced diameter.

Two distinct groove structures, each leading to a different flow path, are formed on the stem 94. The first groove structure 102, which is part of the first flow path 26, is formed just below the inlet aperture and across the width of the stem 94, as shown in FIG. 6. The first groove structure 102 allows the water to flow directly from the inlet aperture 62 through to the outlet aperture 30. When the valve 34 is actuated for the first flow path, the T-handle 96 is positioned to be flush, or in line with, the lateral extension 62 of the skeletal structure 58, as shown in FIGS. 1 and 6.

The second groove structure 104, which is part of the second flow path 28, is formed just below the inlet aperture 46 and along the length of the stem 94 to open into the bore 92 formed in the lateral extension 62 of the skeletal structure 58. The second groove structure 104 is the beginning of the second, or filtered, flow path 28, which is described in more detail below. The two groove structures 102 and 104 are formed in the stem 94 offset at 90 degrees from one another. When the valve 34 is actuated for the second flow path 28, the T-handle is positioned to be transverse to the lateral extension 62 of the skeletal structure 58, as shown in FIG. 7.

The stem 94 is rotatably received in the bore 92, and is axially maintained therein by the edges of the external shroud (lower 66 and bottom 64 portions) inserted into the annular groove 100 formed between the T-handle 96 and the stem 94. The appropriate water-tight seals (O-rings) are positioned on the stem 94 to inhibit water flow past the stem, or between the first 102 and second 104 groove structures.

The second, or filtered, flow path 28 generally runs from the inlet aperture 46, past the valve 34 in the second position, through the second groove structure 104, and into the bore formed in the laterally extending portion of the skeletal structure, as shown in FIG. 7. From this point, as shown in FIG. 7, the second flow path continues into the base of the upright portion 60 of the skeletal structure 58 and up into the filter cartridge 38. The second flow path continues from the filter cartridge 38 down through the meter system 36 and out the filtered outlet aperture 32 (FIGS. 8 and 9).

In greater detail, the second flow path runs through several different components in the skeletal housing structure 58. The second flow path runs from the bore 92, through a tunnel 93 formed under the bottom edge of the upright portion 60 of the skeletal structure 58, up through a first vertically oriented channel 108 through the meter case 106, as shown in FIG. 7. The filter cartridge is positioned above the meter case 106 and rests on a plurality of supports 107 extending upwardly from the meter case 106. The inlet port 110 of the filter cartridge 38 is in fluid communication with the outlet 112 of the first vertical oriented channel 108 formed through the meter case 106. The second flow path 28 continues through the filter cartridge 38 to the outlet port 114 of the filter cartridge 38, as shown in FIGS. 8 and 9.

As shown in FIGS. 8 and 9, the outlet port 114 of the filter cartridge 38 is in fluid communication with the inlet aperture 116 of the second vertical channel 118 formed through the meter case 106. The meter system 36 is partially positioned in the second vertical channel 118, which has an outlet aperture 120 in fluid communication with the outlet, or filtered water, outlet aperture 32 for the second flow path 28.

The filter cartridge 38 can be made of any type of filter material that is normally used in this type of product. The flow path through the filter cartridge 38 is not crucial to the working of this invention as long as the flow path terminates in an outlet port 11I formed in the filter cartridge 33. A preferable filter cartridge type is fibrous activated carbon block, manufactured by Fibredyne Corporation of Dover, N.H. In the filter cartridge 38 set forth in this embodiment, the water flows radially through the filter cartridge 38 to a central cylindrical void, where the water falls under the force of gravity and pressure to the bottom of the filter cartridge and out the outlet port 114, as shown in FIG. 7.

The meter case 106 defines an internal cavity 122 which houses the meter system 36 of the present invention. The meter case 106 also forms two legs of the second flow path 28: the first vertically oriented channel 108 to carry fluid to the inlet port 110 of the filter cartridge 38, and the second vertically oriented channel 118 to carry fluid from the outlet port 114 of the filter cartridge 38, past the meter system 36, to the filtered outlet 32. The two legs of the second flow path are formed through the cavity 122 of the meter case 106, but do not allow fluid to pass into the cavity 122 itself. The meter case 106 engages the base 124 of the skeletal structure 58. The meter case 106 has a top surface 128 and a continuous side wall 130 attached around the perimeter of the top surface 128 and extending downwardly. The meter case 106 fits in the upright portion 60 of the skeletal structure 58, engaging the base 124 around the circumference of the bottom edge 132 of the sidewall 130. The filter cartridge 38 sits on the top of the meter case 106.

As best seen in FIG. 7, the first vertical channel 108 of the second flow path 28 formed through the cavity 122 is defined by a tube 134 extending upwardly from the base 124 to sealingly mate with an appropriately positioned aperture formed in the top surface 128 of the meter case 106. The aperture in the meter case 106 is formed at the top of a short section 136 extending upwardly and downwardly from the meter case 106. The tube 134 inserts into the bottom end of the short section 136 and engages a seal (such as an O-ring) to form a water-tight connection. A grommet 138 is inserted into the aperture from the top of the short section 136 to engage a seal (such as an O-ring) in conjunction with the sidewalls of the inlet port 110 of the filter cartridge 38 to complete the water tight connection. The water thus flows through the tunnel 93, through the tube 134l, past the seals, through the grommet 138 and into the inlet port 110 of the filter cartridge 38.

The second vertical channel 118 of the second flow path 28 formed in the meter case 106 extends through the meter case 106 in line with the outlet port 114 of the filter cartridge 38, as best seen in FIGS. 8 and 9. The outlet aperture 120 is formed in the base 124, and a corresponding aperture is formed in the meter case 106. The aperture formed in the meter case 106 is formed at the top of a short section 140 extending upwardly and downwardly from the meter case 106. A grommet 139 is inserted into the aperture from the top of the short section 140, and a seal is formed between the outer surface of the short section 140 and a cylindrical flange 142 extending downwardly from around the outlet port 110 of the filter cartridge 38, such as by an O-ring.

A turbine housing 144 extends upwardly around the outlet aperture 120 in the base 124, and defines opposing v-shaped axle-brackets 146, each having open top ends for rotatably supporting the cylindrical axle ends 147 extending from the turbine 148 therein, as described in greater detail below. A flow conditioner 150 is positioned between the inlet aperture in the cover 126 and the top of the turbine housing 144. The flow conditioner 150 includes a planar base 152 for engaging the top edge of the turbine housing 144, and an upwardly extending collar 154 for insertion into the section 140 extending downwardly from around the aperture formed in the cover 126. A seal is formed (such as by an O-ring) between the flow conditioner 150 and the cover 126. A rim 154 extends downwardly from the planar base 152 of the flow condition 150 to be received just inside the top edge of the turbine housing 144. Two prongs 156 extend downwardly from the rim 154 of the flow conditioner 150 and terminate adjacent the axle brackets 146 when the flow conditioner 150 is in engagement with the turbine housing 144. The prongs 156 retain the turbine 148 in the axle brackets 146 and keep the turbine 148 from becoming misaligned. An oval aperture 158 is formed in the planar base 152 inside the collar for directing the fluid flow onto the proper portion of the turbine to affect rotation. The water flowing from the outlet port 114 of the filter cartridge 38 thus flows through the grommet 139, through the aperture in the meter case 106, through the flow conditioner 150, through the turbine housing 144, past the meter system 36, and out the outlet aperture 32.

The battery 160 for powering the meter system 36 is suspended in the cavity 122 of the cassette 106 from the top surface 128 of the cover 126, as shown in FIGS. 3B, 8, 10 and 12. The battery is preferably a CR2032 three-volt watch-type battery which is expected to operate for approximately 2 years when incorporated with the meter system of the present invention. A battery holder 162 supports the battery 160 in a vertically oriented position through a slot 164 formed in the cover 126 of the cassette 106. The battery holder 162 has a top member 166 for forming a seal to the top surface 128 of the cover 126, a grip portion 168 for providing a location to grasp the holder 162 to remove the battery 160 from the cassette 106, and a downwardly depending seat 170 which holds the battery 160 vertically. The seat 170 has a circumferential rim to securely engage the outer periphery of the battery 160, and has open sides to allow contact with both sides of the battery 160.

Figure 12:
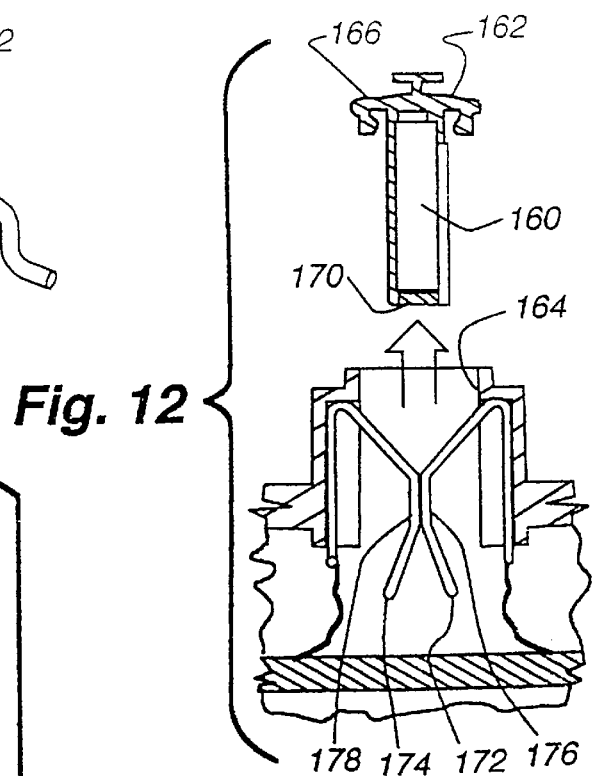
FIG. 12 is a representational partial section similar to FIG. 10, wherein the battery is removed from the clips.

A pair of contact clips 172, 174 automatically engage the battery 160 through the open sides in the holder 162 to provide and carry electrical power to the meter system 36. The contact clips 172, 174 are positioned in the cassette 106 adjacent to the position of the battery 160 such that when the battery is inserted (FIG. 10), one clip 172, 174 contacts each side of the battery 160. When the battery 160 is removed, the clips 172, 174 extend to contact each other (FIG. 12). Each clip 172, 174, as shown in FIGS. 8, 10–13, is a single length of wire having opposing ends and a centrally formed D-shaped spring contact 176, 178. The D-shaped spring contact 176, 178 extends from the top inwardly and downwardly to a free end. The bend in the wire at the top creates the spring bias force to bias each spring contact 176, 178 inwardly to engage the other spring contact in the absence of the battery 160. The removal of the battery 160 causes the spring contacts 176, 178 to engage one another and reset the meter system 36, as described in greater detail below.

Figure 17:
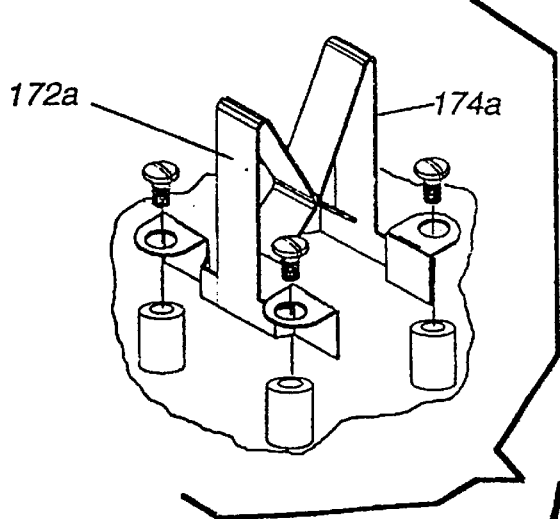
FIG. 17 is an enlarged perspective view of an alternative embodiment of the battery clips as shown in FIG. 4B.

An alternative embodiment of the battery contact clips 172a and 174a are shown in FIG. 17. These contact clips are formed of sheet metal and have basically same shape and function as the above-described contact clips 172 and 174. The contact clips 172a and 174a are held in place by fasteners, such as screws, which attach through the ends of the each contact clip into the meter case 106.

As shown in FIG. 7, the meter case 106 also includes a port 180 into which the output device 40 (such as an LED) of the meter system 36 is inserted when the meter case 106 is positioned on the base 124. The port 180 is positioned next to a lens 182 positioned in the riser portion 68 of the shroud. The LED extends out of the port adjacent to the base of the lens. The lens is inserted to fit through an aperture 183 formed in the side wall of the shroud and a corresponding aperture in upright portion 60 of the skeletal structure. The base of the lens extends into the upright portion of the skeletal structure to terminate adjacent to the position of the LED extending through the port. The lens is preferably made of polycarbonate thermoplastic resin, or other light-transmissive material. When the LED is actuated by the meter system 36, the light emitted therefrom luminesces the lens 182. In this way the user can see the actuation of the output device 40 to inform the user of the performance status of the filter member measured by the meter system.

The meter system 36, as shown in FIGS. 3B, 7 and 8, is contained in part a the cavity 122 formed in the meter case 106, in conjunction with the turbine 148 positioned in the flow stream in the turbine housing 144. The meter system 36 includes the rotatable turbine positioned in the flow stream, a sensor 184 and microcontroller 186, and an output device 40. The sensor 184, microcontroller 186 and output device 40 are all positioned on a circuit board 188 that fits into the cassette 106, and are electrically connection to the battery 160. The meter system 34 performs two basic record keeping functions. First, the meter system 34 counts the time from when the meter system was last reset. The meter system 34 is reset by removing and reinserting the battery. When the battery 160 is removed from the holder 162, the clips 172, 174 engage and reset the microcontroller 186 and the counters used therein.

Second, the meter system 36 calculates the total flow of water through the filter cartridge 38 by monitoring the movement of the turbine 148. As described below, the turbine turns a known number of times per unit volume of water flowing past the turbine. Both of these functions are performed simultaneously, by the sensor 184 and microcontroller 186, as described in greater detail below.

Figure 18:
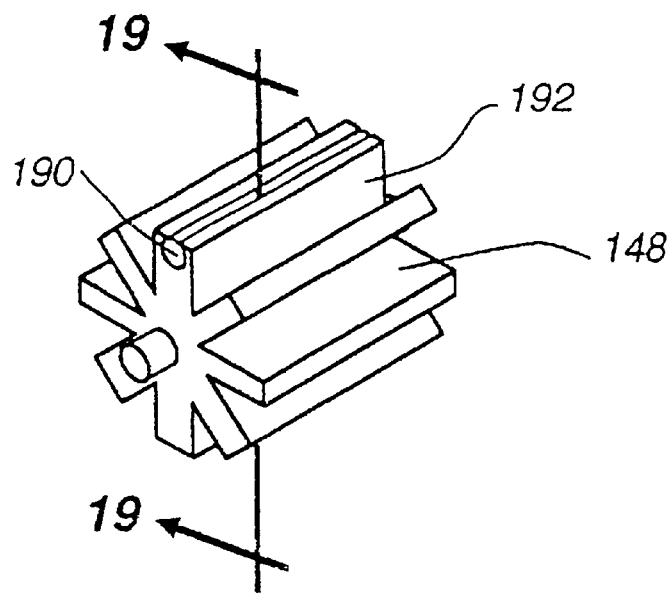
FIG. 18 is an enlarged view of the turbine.
Figure 19:
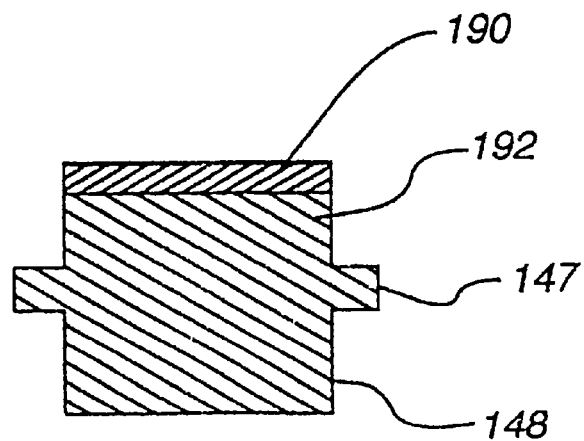
FIG. 19 is a section taken along lines 19—19 of FIG. 18.
Figure 20:
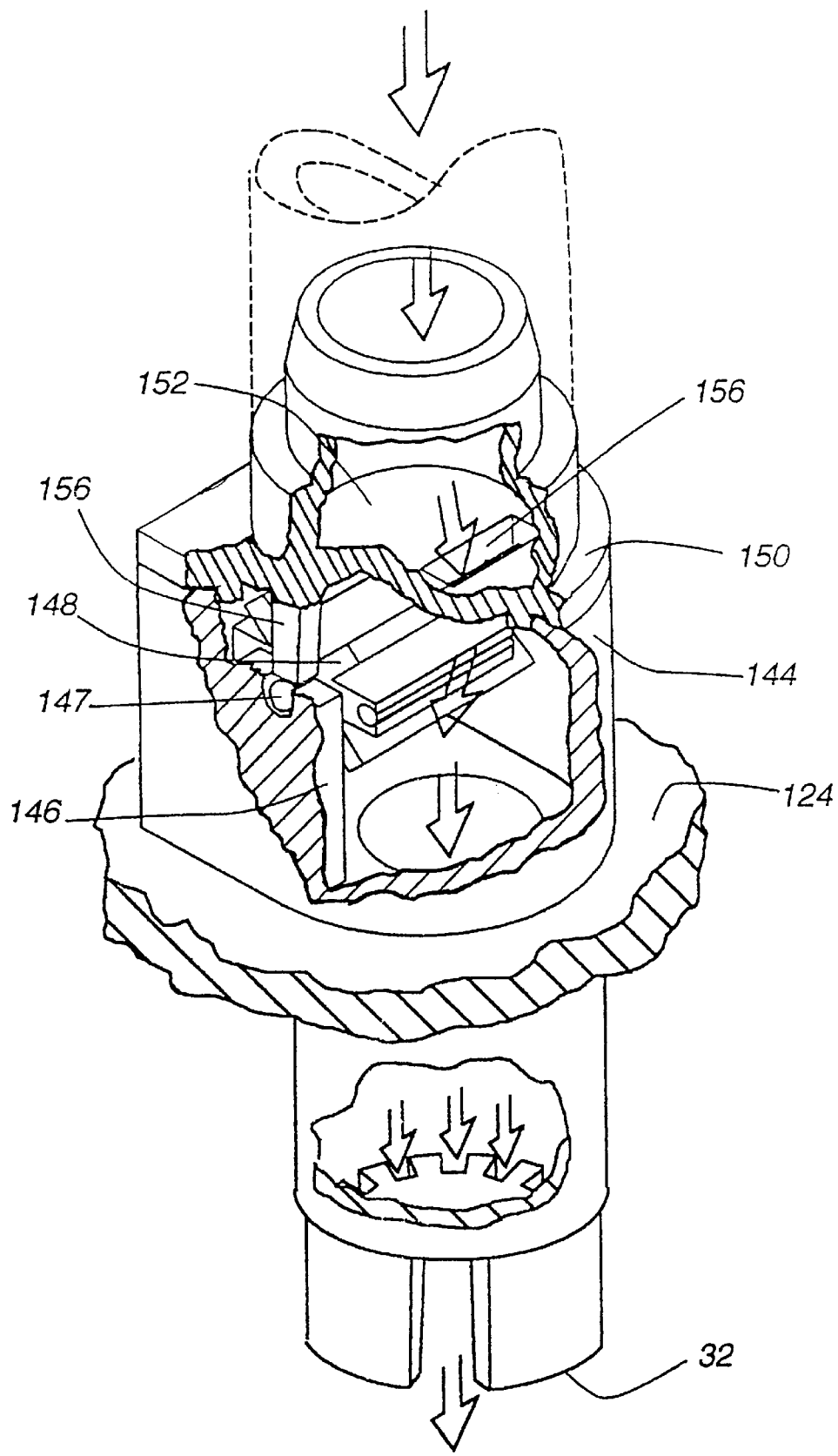
FIG. 20 is an enlarged representational partial section of the second vertical channel and the surrounding structure.

The turbine 148, or flow reactive device, is rotatably positioned in the turbine housing 144, and has a signal generating member 190 mounted thereto. Preferably, the turbine is Generally an elongated cylinder having radially extending turbine blades 192 formed along the Length of the cylinder, as shown in FIGS. 18 and 19. One blade 192 of the turbine 148 has a magnetic rod 190 positioned in its tip, the rod extending along, the length of the blade 192. The turbine blades 192 opposite the one having the magnetic rod 190 are designed to have greater mass (greater blade thickness dimension) in order to counter-balance the additional weight of the magnetic rod. In particular, the turbine 148 has eight equally spaced blades, and the three blades opposite the blade with the magnetic rod positioned therein are thicker than the other blades. This feature is important since the turbine rotates at a relatively high frequency, and any imbalance in the rotational inertia would prove detrimental to the performance of the meter system 36, as well as the structural integrity of the turbine and the axle brackets 146. There are other means of balancing the turbine 148, such as placing a counter weight in an opposing blade, or other location, to obtain the desired counter-balance function.

The turbine 148 is positioned under the aperture 158 in the flow conditioner 150. Preferably, the aperture 158 is over an outer portion of the fins 192 of the turbine 148 so that the water flow impacts predominantly one side of the turbine 148 to cause it to turn in one direction only (counterclockwise in FIG. 9). The turbine 148 of the presently disclosed embodiment is approximately ⅜ inches long, 0.5 inches in diameter, with a fin length of approximately ⅛ inches. This turbaned 148 rotates approximately 6140 times per gallon of water that flows through the second vertically oriented channel. The error of the turbine rotation per gallon of water is <15%, and depends upon flow rate of the fluid. It is contemplated that the specific design of the turbine could be modified, which would change the relationship between the number of rotations and gallons of flow.

The sensor 184 and microcontroller 186 are formed of electrical components interconnected on a circuit board 188, which is positioned in the cavity 122 formed by the cassette 106, out of the flow of the water. The sensor 184, such as a reed switch or hall-effect sensor, is positioned near the turbine housing 144 and adjacent to the turbine 148. The sensor is inside the cavity, while the turbine 148 is in the second vertically oriented channel 118, with the wall of the turbine housing 144 positioned therebetween. The sensor and microcontroller assembly is thus maintained in a relatively dry condition to minimize the detrimental effects of the water on the performance of the meter system 36.

Figure 14:
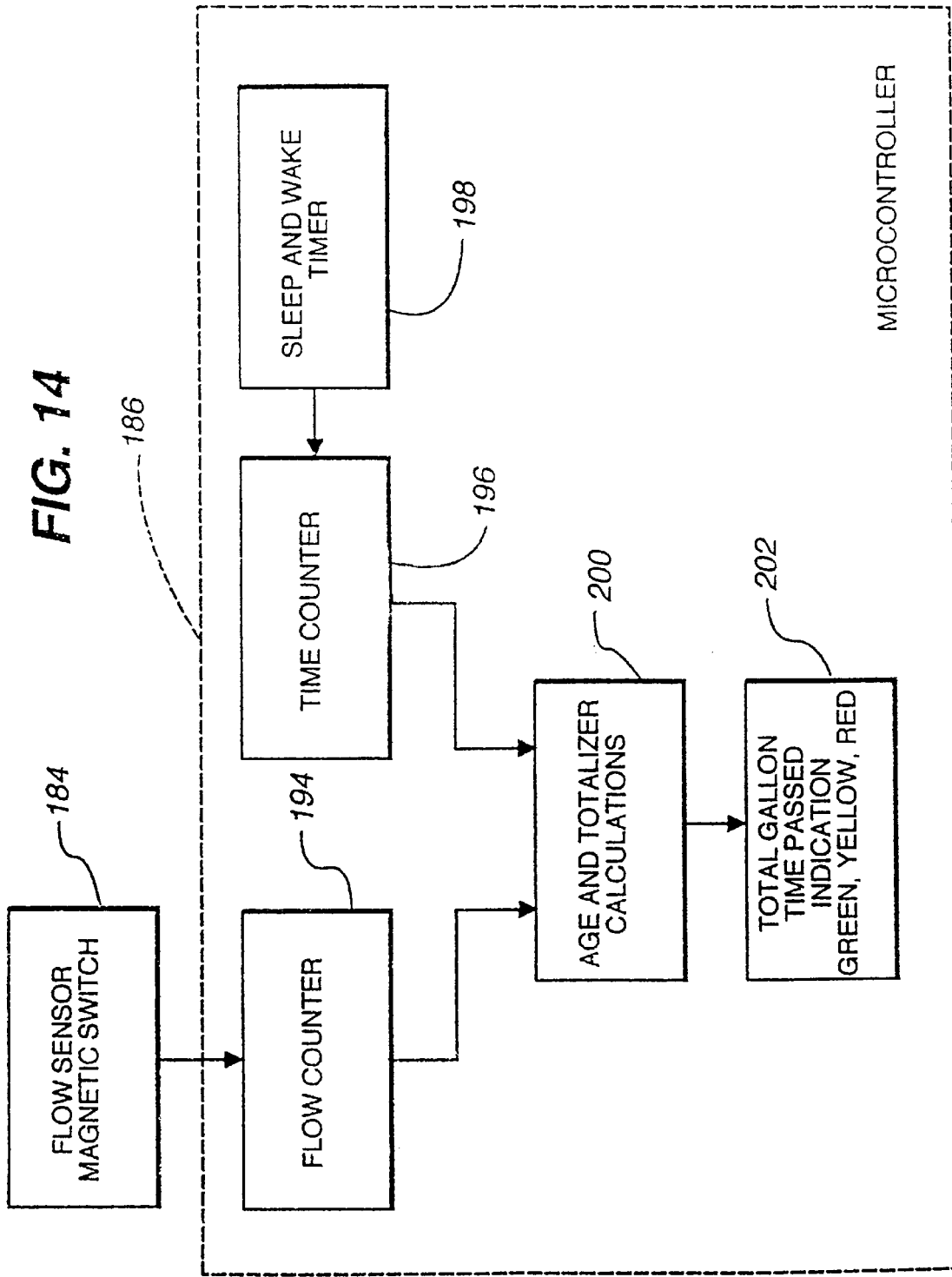
FIG. 14 is a functional block diagram of the meter system.
Figure 15:
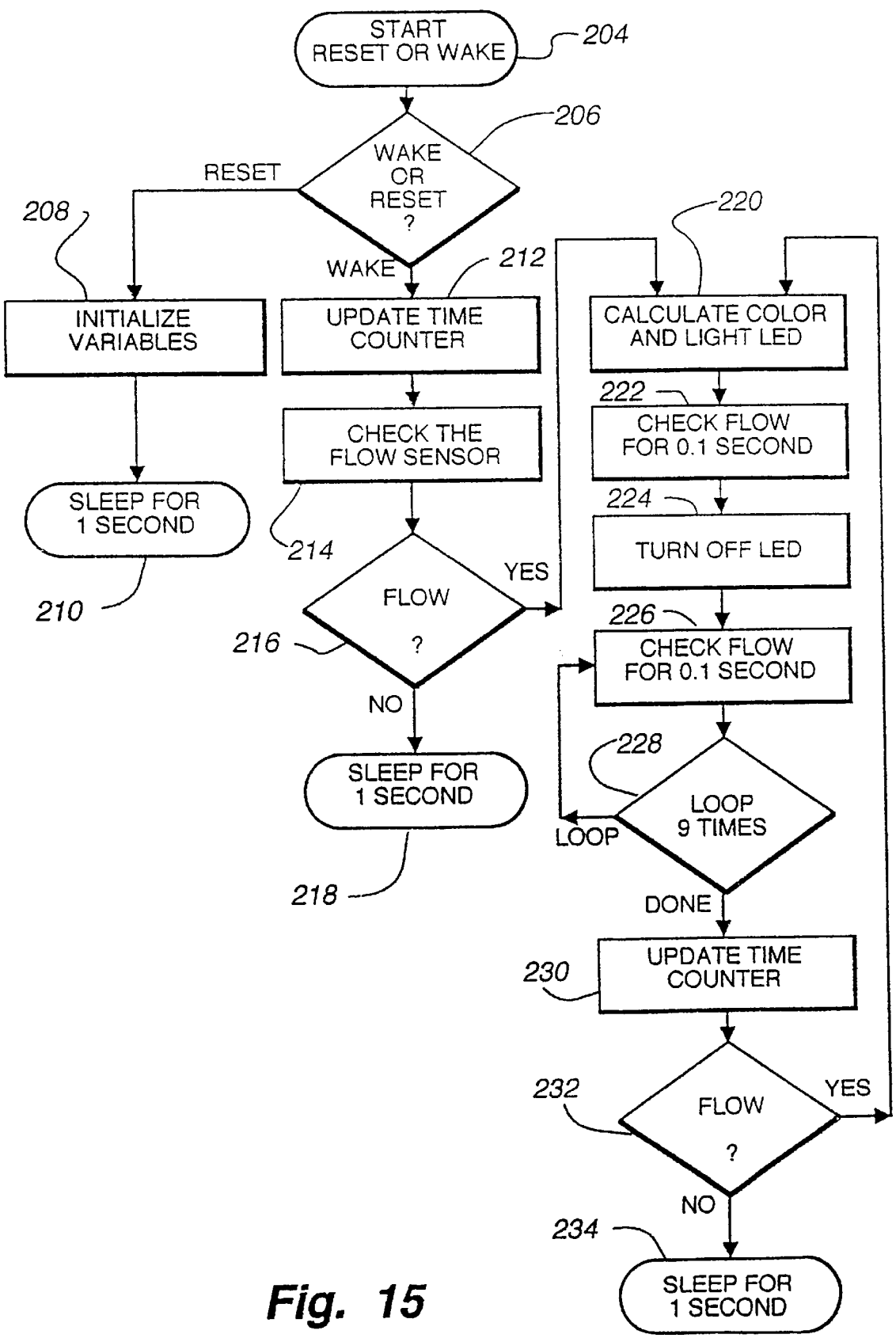
FIG. 15 is a flow chart indicating the operation of the meter system.
Figure 16:
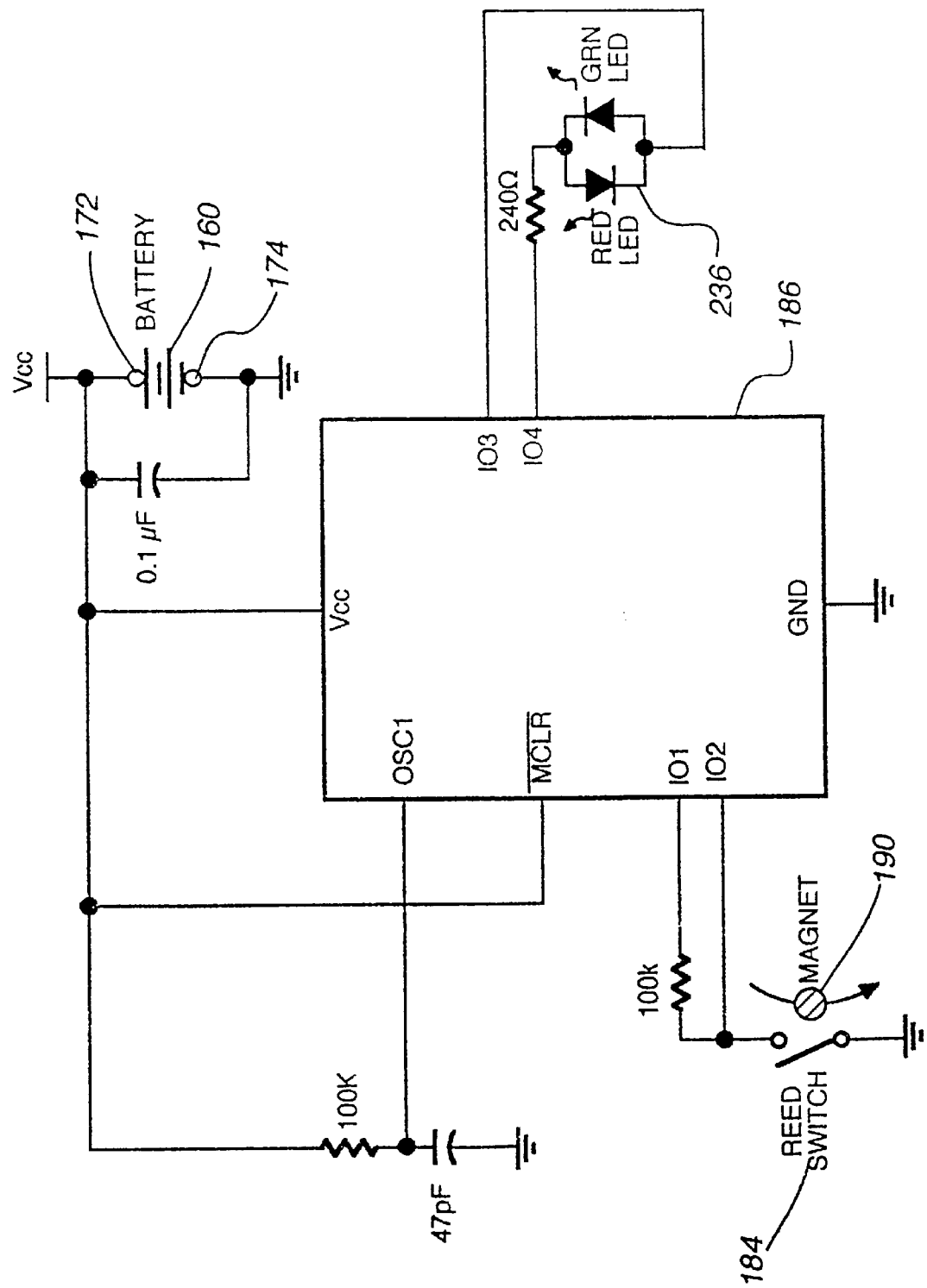
FIG. 16 is a schematic diagram of the flow sensor and the microcontroller of the meter system.

The operation of the sensor 184 and microcontroller 186 is shown in FIGS. 14, 15 and 16. FIG. 14 is a functional block diagram of the sensor and microcontroller, and shows a microcontroller 186 having a flow counter 194, a time counter 196, a sleep/wake timer 198, an age/totalizer module 200, and an output module 202. The flow counter 194 is responsive to the external flow sensor 184 and counts the number of rotations of the turbine 143 during operation of the water treatment device 20. The time counter 196 is responsive to the sleep/wake timer 198 to periodically count real time increments. The age/totalizer module 200, responsive to the flow counter 194 and the time counter 196, calculates the total amount of time which water is passed through the filter cartridge 38 of the water treatment device 20, as well the total amount of fluid passed through the filter cartridge 38. The output module 202 is used to control the output device 40 to provide the proper user information as previously described. The values from the flow counter 194 and the time counter are maintained in the microcontroller 186 until the battery 160 is removed and reinserted to reset the microcontroller.

The sleep/wake timer 198 cycles the microcontroller 186 between a low-power sleep state and a wake state. In the sleep state, the microcontroller enters its lowest power operation mode and awaits the wake mode, thereby reducing the microcontroller's power consumption from the battery 160 (i.e., to 3 micro-amps or less). In the wake mode, the microcontroller 186 resumes normal operation and measures any water flow, updates the time counter 196, and performs various calculations, described below.

The flow sensor 184 can sense, through the wall of the turbine housing 144, the movement of the magnetic rod 190 as it rotates, thus generating a signal indicative of the number of, and the frequency of, the rotations of the turbine 148 as it is driven by the water flowing through the second flow path 28. The flow sensor 184 sends the signal containing this information to the flow counter 194, which records the total flow past the turbine 148, and thus through the filter cartridge 38. The flow sensor 194 generates and sends a signal containing the turbine rotation information to the age/totalizer module 200, which converts the rotation information to total flow information via a known rotation-to-flow relationship, known as the-first performance data. This information is used for several purposes, including for comparison against the respective threshold data in the programmed controller.

Concurrently, to the operation of the flow counter 194, the timer 198 operates according to the flow chart in FIG. 15 to control the time counter 196, which tracks the elapsed time since the meter system was reset or started (by pulling and replacing the battery). This total time recorded and stored by the time counter 196 is translated into a signal, which is sent to the age/totalizer module 200, and is the second performance data. The age/totalizer module 200 compares the data in the signals received from the flow counter 194 and the time counter 196, and determines the status of the filter cartridge 38 against the pre-programmed threshold requirements. Based on the status of the filter cartridge 38, the output device 40 is actuated accordingly to transmit the information to the user.

The microcontroller is pre-programmed to include threshold data levels for total time elapsed, and total flow, since resetting the microcontroller. There may be several sets of threshold requirements pre-programmed into the microcontroller for different output signals.

The following is one example of several sets of threshold requirements Where the cartridge is rated for 200 gallons or 90 days, the microcontroller is programmed to: 1) actuate the output device 40 to blink green (acceptable signal) when the filter cartridge 38 is less than or equal to 90% "used," as determined by flow volume (180 gallons) or time (81 days); 2) delay actuation (delay signal) of the output device per 1) above for 3 seconds each time the turbine 148 transitions from resting state to a rotating state; 3) actuate the output device 40 to blink yellow (flush signal) for 2 minutes where the meter system 36 has just previously been reset and the turbine 148 transitions from a resting stated to a rotating state; 4) actuate the output device 40 to blink yellow (caution signal) when the filter cartridge is greater than 90% "used" and less than 100% "used," as determined by either flow volume (180+ gallons) or time (81+ days); and 5) actuate the output device 40 to blink red (terminate signal) when the filter cartridge 33 is 100% "used" or more, as determined by either flow volume (200 gallons) or time (90 days). The microcontroller is pre-programmed according to the above information to include the appropriate threshold requirements for comparison to the flow and time data for the proper output signal. The above threshold requirements have been found to be desirable from a utilitarian and commercial perspective. It is contemplated that other threshold requirements can be programmed into the microcontroller.

The flow counter 194 and the time counter 196 provide this information to the age/totalizer module 200 to compare against the appropriate performance threshold data programmed in the microcontroller to determine the proper status for the output device 40.

In general, a meter system 36 for a water treatment device 20 is described, the device having an inlet aperture 46 and an outlet aperture 32, and a flow path 28 for channeling water between the inlet 46 and outlet 32 apertures A flow reactive device 148, such as a turbine or paddle wheel, is positioned in the path 28 and exposed to the flowing water, and a signal generating member 190, such as a magnetic member, is positioned on the flow reactive device 148. A sensor 184 or switch, such as a reed switch, is positioned proximately to the flow reactive device 148, and is sensitive to the proximity of the signal generating member 190. The sensor 134 is able to communicate electric signals indicative of the motion of the signal generating member 190.

The resettable microcontroller has at least one performance threshold programmed therein. The performance threshold could be the total flow or the total time allowed for the filter cartridge 38 in the particular water treatment device 20. The microcontroller 186 is in electrical communication with the sensor 184 for receiving electrical signals from the sensor 184. The sensor 184 is capable of sensing the characteristics of the flow reactive device 148 and communicates electrical signals representative of these characteristics to the microcontroller 186. The microcontroller 186 interprets the signals as a first performance data, the microcontroller also having a time counter 196 for totaling the time lapse since the microcontroller was last reset. The microcontroller interprets the time lapse as a second performance data, and the microcontroller compares the first performance data and the second performance data against the respective performance threshold to determine if the performance threshold has been surpassed by either the first or second performance data. If the respective threshold data was surpassed, the microcontroller 186 actuates the output device 40 to display to the user the status of the cartridge filter in the water treatment device 20.

In a farther embodiment, there is a set of first and second (90% time and flow limits) and a set of third and fourth (100% time and flow limits) performance thresholds programmed into the microcontroller 186, each set having their own respective output signals. The microcontroller compares the first performance data (flow) and the second performance data (time) against the set of first and second performance thresholds, and against the set of third and fourth performance thresholds to determine which set of thresholds has been surpassed. If either set of performance thresholds have been surpassed by either the first or second performance data, the microcontroller actuates the output device 40 to display the respective output signal.

FIG. 15 is a flow chart of the operation of the microcontroller 186 in controlling and sequencing the operation of the meter system 36 as shown in the functional block diagram of FIG. 14. The method starts with the Start Reset or Wake 204 operation, and moves to the Wake or Reset? decisional operation 206. If the status here is reset, then move to the Initialize Variables 208 operation and perform the Sleep for 1 Second operation 210. The Sleep for 1 Second Operation 210 loops back to the Start Reset or Wake Operation 204.

If at the Wake or Reset? Decisional 206 and the status is wake, then move to the Update Time Counter operation 212 (which starts the tolling of the time since the last reset of the meter). Then move to Check Flow Sensor 214. If no flow at the flow decisional 216, then move to the Sleep for 1 Second operation 218, which is interruptible and loops back to the Start Reset or Wake operation 204. In other words, if there is no flow, then simply update the counter to track cumulative time. Any decisions by the microcontroller 186 based on this data would be based on the time the device has been active. In other words, if there is no flow, then the microcontroller 186 would use the elapsed time to compare to the thresholds and actuate the output device 40 accordingly.

If at the Check Flow Sensor 214 and there is flow at the flow decisional 216 as indicated by the rotation of the turbine as sensed by the sensor (i.e., reed switch), then move to the Calculate Color and Light LED 220. operation. Next, the Check Flow for 0.1 Second 222 operation is performed, and then the Turn Off LED 224 operation is performed (causing LED to flash during use). Check Flow for 0.1 Second operation 226 is then performed again and looped 9 times 228, at which point, when done, the Update Time Counter 230 operation is performed. The flow decisional 232 is then attained, and if no flow, Sleep for 1 Second operation 234 is performed, which if interrupted goes back to the initial Start Reset or Wake Operation 204. If there is flow, then loop back to the Calculate Color and Light LED 220 and begin this leg of the flow chart over again.

FIG. 16 is a circuit diagram illustrating an embodiment of the electrical components of the meter system. The microcontroller 100 has an oscillator input (OSCI), a master clear (MCLR) input which resets the processor, and configurable input/output pins shown as IO1, IO2, IO3, and IO4. An 8-bit microcontroller model PIC16C54 from the Microchip Company can be used for microcontroller 186.

As previously described, the battery 160 establishes the power supply for the processor 186 when placed across the contact clips 172. A standard filtering capacitor is placed in parallel with the battery 160 to minimize ripples in the supply voltage. The oscillator input OSCI of microcontroller 186 is biased with a resistor and capacitor to establish a known and reliable clock cycle which is used to derive the time base from which the calculations are made within microcontroller 186.

Microcontroller 186 is resettable when the MCLR pin (active low) is set low. As previously described, contact clips 172, 174 are spring loaded such that when battery 162 is removed, the contact clips connect the MCLR pin to ground, thereby resetting the processor and the values stored therein, but not the threshold data stored therein.

Sensor 184 (switch), which closes in response to magnetic member 190, is connected to two bi-directional configurable input/output pins IO1 and IO2. In one embodiment of the invention, the IO2 pin is configured as an input pin and the IO1 pin is configured as an output pin. When the microcontroller 186 seeks to determine whether switch 184 is opened or closed, a logic high signal is placed on the IO1 pin, and the logic level present on the IO2 pin is read by the microcontroller 186. If the logic level on the IO2 pin is low, then switch 184 is closed; conversely, if the logic level on the IO2 pin is high, switch 184 is opened. Since the IO1 pin is a reconfigurable input/output pin, the high logic level output at pin IO1 is released by the microcontroller when the microcontroller is not reading the state of switch 184. In this manner, the amount of power consumed when reading switch 184 is reduced.

Input/output pins IO3 and IO4 are both configured as output pins to drive the output device 40, such as LED 236. LED 236 can consist of a combination of LEDs to provide the appropriate output signals, or colors, as needed.

While FIG. 16 shows a microcontroller 186 and associated circuitry for implementing the operations and functions described herein, it is understood that equivalent microcontrollers, microprocessors, controllers, processors, discrete logic, real time counters or other electronic counting devices and associated circuitry could also be used without departing from the scope of the present invention.

In operation, with the water treatment device 40 attached to the end of a faucet 22, the meter system 36 is reset or initialized by removing and reinserting the battery 160. This is accomplished by grasping the grip portion 168 of the holder 162 and remove the holder from the slot 164 in the top of the cassette 106. When the battery 160 is removed, the spring, contacts 176, 178 touch one another and reset the totalizer system to an initial condition.

Once the battery 160 is re-inserted (or replaced with a new battery), the meter system 36 initiates two counter functions for simultaneous operation in the meter system: 1) the total flow counter and 2) the time counter. The total flow counter is driven by the amount of water passing, the turbine 148, determining the number of rotations of the turbine 148. The number of rotations of the turbine is sensed by the sensor 184 and is accumulated and converted in the meter system 36 into total gallons. The time counter, starts once the battery is re-inserted, with elapsed time since re-insertion being stored and accumulated in the meter system 36.

The meter system 36 is programmed to output certain signals through the output device 40 depending on the status of the total flow or total time as measured. The system beneficially alerts the user to the status of the filter cartridge performance in the filter unit to provide information on when to change the filter cartridge, or on when to plan on purchasing a new filter cartridge to replace an existing filter cartridge soon to expire.

In the embodiment described herein, the meter system can preferably provide the following, information:

1. Activate a first signal (e.g,. blink green) through the output device 40 when the filter cartridge 38 is within the flow and time limits (i.e. less than 90% flow or use thresholds).
2. Activate a second signal (e.g. blink yellow) through the output device 40 when 90% of the total flow of the filter cartridge 38 is used, or when 90% of the total time has lapsed, whichever occurs first;
3. Activate a third signal (e.g. blink red) through the output device 40 when 100% of the total flow of the filter cartridge 38 is used, or when 100% of the total time has lapsed, whichever occurs first;
4. Delay activation of all signals through the output device 40 for a predetermined time (erg. for 3 seconds) when the filter cartridge 38 is within flow and time limits at the initiation of each use.
5. Activate a fourth signal (e.g. blink yellow) through the output device 40 when the filter cartridge 38 is new to indicate a flush period.

A presently preferred embodiment of the present invention and many of its improvements have been described with a degree of particularity. It should be understood that this description has been made by way of example, and that the invention is defined by the scope of the following claims.

What is claimed is:

1. A meter system for a water treatment device, the device having an inlet aperture and an outlet aperture, and a channel for channeling flowing water between the inlet and outlet apertures, the meter system comprising:

a flow reactive device;

a signal generating member causing said flow reactive device to produce a spatially varying signal in reaction to water flow;

a sensor generating a flow signal corresponding to water flow in the channel;

an output device for indicating when the water treatment device is usable; and a controller coupled to receive and accumulate the flow signal, and including a plurality of thresholds, with at least one of said thresholds representing a delay function during water flow, said controller comparing the accumulated flow signal to said thresholds, the controller not actuating the output device when the accumulated flow signal is below said threshold representing a delay function, the output device thus indicating the delay function, and the controller activating the output device when the accumulated flow signal exceeds at least one of said thresholds other than said threshold representing a delay function.

2. A meter system as defined in claim 1, wherein at least one of said thresholds corresponds to a total number of gallons passed through said channel.

3. A meter system as defined in claim 1, wherein the flow reactive device is a turbine rotatable about an axis and having a plurality of blades.

4. A meter as defined in claim 3, wherein said sensor is unexposed to the flowing water.

5. A meter system as defined in claim 1, wherein the signal generating member is a magnet.

6. A meter system as defined in claim 1, wherein:

the flow reactive device is a turbine rotatable about an axis, and having a plurality of blades equally spaced about the turbine, each blade having a distal end; and a magnetic member positioned in the distal end of one of the blades, and wherein at least one blade opposite the blade containing the member is enlarged.

7. A meter system as defined in claim 1, wherein the sensor is a reed switch.

8. A meter system as defined in claim 1, wherein the sensor is a hall-effect sensor.

9. A meter system as defined in claim 1, wherein at least one of said thresholds represents a period of time.

10. A meter system as defined in claim 1, wherein at least one of said thresholds represents a volume of water flow.

11. A meter system as defined in claim 1, wherein the signal generating member produces a magnetic field.

12. A meter system as defined in claim 1, wherein:

said controller includes a threshold representing a period of cautious use;

said output device has a signal corresponding to said threshold representing a period of cautious use; and said controller activates the signal corresponding to said threshold representing a period of cautious use of said output device when the flow signal exceeds said threshold representing a period of cautious use.

13. A meter system as defined in claim 12, wherein:

said controller includes a threshold representing a termination of use;

said output device has a signal corresponding to said threshold representing a termination of use; and said controller activates the signal corresponding to said threshold representing a termination of use of said output device when the flow signal exceeds said threshold representing a termination of use.

14. An end-of-faucet filter for filtering water flowing through a faucet, said end-of-faucet filter comprising:

a housing having an inlet aperture for attachment to the faucet, an outlet aperture, a channel extending between said inlet and outlet apertures, and a filter positioned in said channel to filter water flowing therethrough;

a turbine rotatable about an axis positioned in the channel and exposed to the flowing water, the turbine having a plurality of blades equally spaced about the turbine, each blade having a distal end;

a magnetic member positioned in the distal end of a first one of the blades, and a counterweight positioned in the distal end of a second one of said blades directly opposite said first one of said blades to counterbalance the turbine;

a sensor positioned proximate to the turbine, and being sensitive to the movement of the turbine, the sensor able to communicate electric signals indicative of the motion of the magnetic member;

a resettable mircrocontroller having an output device, and a plurality of performance thresholds programmed therein, the microcontroller in electrical communication with the sensor and the microcontroller also having a time counter for totaling the time lapse since the microcontroller was last reset, said microcontroller interpreting at least said electric signals from said sensor and said time lapse as performance data, the microcontroller comparing the performance data against the performance thresholds to determine if any of the performance thresholds have been surpassed, and when surpassed actuating the output device.

15. An end-of-faucet filter as defined in claim 14, wherein the sensor is a reed switch.

16. An end-of-faucet filter as defined in claim 14, wherein the sensor is a hall-effect sensor.

17. An end-of-faucet filter as defined in claim 14, wherein the turbine is oriented in said channel such that the water flowing through said channel tangentially-impacts said turbine.

* * * * *